(12) United States Patent
Min et al.

(10) Patent No.: US 11,630,486 B2
(45) Date of Patent: Apr. 18, 2023

(54) FOLDABLE DISPLAY DEVICE

(71) Applicant: Samsung Display Co., LTD., Yongin-si (KR)

(72) Inventors: Myung An Min, Cheonan-si (KR); Yong Gi Ko, Anyang-si (KR); Hyoung Jin Lee, Cheonan-si (KR); Hye Ji Jang, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 299 days.

(21) Appl. No.: 17/012,383

(22) Filed: Sep. 4, 2020

(65) Prior Publication Data

US 2021/0263562 A1    Aug. 26, 2021

(30) Foreign Application Priority Data

Feb. 21, 2020   (KR) ................... 10-2020-0021656

(51) Int. Cl.
| | | |
|---|---|---|
| *H04M 1/00* | (2006.01) | |
| *G06F 1/16* | (2006.01) | |
| *H04M 1/02* | (2006.01) | |
| *G01J 1/02* | (2006.01) | |

(52) U.S. Cl.
CPC ........ *G06F 1/1652* (2013.01); *H04M 1/0214* (2013.01); *G01J 1/0233* (2013.01); *G01J 1/0271* (2013.01); *H04M 1/0268* (2013.01); *H04M 2250/12* (2013.01)

(58) Field of Classification Search
CPC ............. H04M 1/0268; H04M 1/0214; H04M 2250/12; G06F 1/1652; G01J 1/0271; G01J 1/0233
See application file for complete search history.

(56) References Cited

U.S. PATENT DOCUMENTS

| | | | | |
|---|---|---|---|---|
| 9,588,549 | B2* | 3/2017 | Endo | ................... H01L 51/5237 |
| 10,171,636 | B2* | 1/2019 | Yeo | .................... H04M 1/0277 |
| 2017/0287992 | A1 | 10/2017 | Kwak et al. | |
| 2017/0289324 | A1 | 10/2017 | Yeo et al. | |

FOREIGN PATENT DOCUMENTS

| | | |
|---|---|---|
| KR | 2020080003275 | 8/2008 |
| KR | 1020150018934 | 2/2015 |
| KR | 1020180061532 | 6/2018 |
| KR | 1020190062143 | 6/2019 |

OTHER PUBLICATIONS

Extended European Search Report-European Application No. EP21156264 0 dated Aug. 9, 2021, citing references isted within.

* cited by examiner

*Primary Examiner* — Nhan T Le

(74) *Attorney, Agent, or Firm* — Cantor Colburn LLP

(57) ABSTRACT

A foldable display device includes a display module in which a panel hole is defined, a sensor device disposed in the panel hole, and a panel lower cover which is disposed on a surface of the display module and in which a cover hole is defined such that the sensor device is disposed in the cover hole, the panel lower cover including a buffer member and a first adhesive member, which attaches the buffer member to the surface of the display module where a minimum distance between the first adhesive member and the sensor device is greater than a minimum distance between the buffer member and the sensor device.

19 Claims, 29 Drawing Sheets

FOLDABLE DISPLAY DEVICE

This application claims priority to Korean Patent Application No. 10-2020-0021656, filed on Feb. 21, 2020, and all the benefits accruing therefrom under 35 U.S.C. § 119, the content of which in its entirety is herein incorporated by reference.

BACKGROUND

1. Field

Embodiments of the invention relate to a foldable display device.

2. Description of the Related Art

As display devices have been applied to various electronic devices, a demand for display devices with a variety of functions and design features is increasing. In order to provide an enlarged display area, through holes are defined in the display area, and display devices having the display area in which through holes are defined and having optical sensors such as a camera sensor, an infrared sensor, and the like arranged in such through holes have been developed, for example. Also, in order to improve portability, and at the same time, to provide a wide display screen, bendable display devices that can be bended in their display area or foldable display devices that can be folded in their display area have been developed.

SUMMARY

In a foldable display device, holes may be defined in a substrate or a film through laser cutting, but due to burrs in the holes, recognition error may be generated in cameras or sensors inserted in the holes.

Embodiments of the invention provide a foldable display device capable of preventing recognition error of cameras or sensors in holes due to any burrs in the holes.

However, the invention is not restricted to those set forth herein. The above and other embodiments of the invention will become more apparent to one of ordinary skill in the art to which the invention pertains by referencing the detailed description of the invention given below.

An embodiment of the invention provides a foldable display device including a display module in which a panel hole is defined, a sensor device disposed in the panel hole, and a panel lower cover which is disposed on a surface of the display module and in which a cover hole is defined such that the sensor device is disposed in the cover hole, the panel lower cover including a buffer member and a first adhesive member, which attaches the buffer member to the surface of the display module where a minimum distance between the first adhesive member and the sensor device is greater than a minimum distance between the buffer member and the sensor device.

In an embodiment, the panel lower cover may include a second adhesive member, which is adjacent to the first adhesive member with the buffer member interposed therebetween.

In an embodiment, a minimum distance between the second adhesive member and the sensor device in the cover hole may be greater than the minimum distance between the buffer member and the sensor device.

In an embodiment, the minimum distance between the first adhesive member and the sensor device may be smaller than or equal to the minimum distance between the second adhesive member and the sensor device.

In an embodiment, a distance between the buffer member and the sensor device in the cover hole may increase as a distance to the display module is smaller.

In an embodiment, a distance between the first adhesive member and the sensor device in the cover hole may increase as the distance to the display module is smaller.

In an embodiment, a cutting plane of the first adhesive member and a cutting plane of the buffer member may be in contact with, and are aligned with, each other in the cover hole.

In an embodiment, a distance between the buffer member and the sensor device in the cover hole may decrease as a distance to the display module is smaller.

In an embodiment, a cutting plane of the second adhesive member and a cutting plane of the buffer member may be in contact with, and are aligned with, each other in the cover hole.

In an embodiment, a minimum diameter of the cover hole may be greater than a maximum diameter of the panel hole.

In an embodiment, the display module may include a display panel, which includes pixels that display an image, and a protective layer, which is disposed on a surface of the display panel.

In an embodiment, the protective layer may be in contact with the first adhesive member, and a minimum distance between the protective layer and the sensor device may be smaller than the minimum distance between the first adhesive member and the sensor device.

In an embodiment, the foldable display device may further include a metal plate attached to a first surface of the panel lower cover via the second adhesive member, where a plate hole, which overlaps with the cover hole, is defined in the metal plate.

In an embodiment, the sensor device may be disposed in the plate hole, and a minimum distance between the metal plate and the sensor device may be smaller than one of the minimum distance between the first adhesive member and the sensor device, a minimum distance between the second adhesive member and the sensor device, and the minimum distance between the buffer member and the sensor device.

An embodiment of the invention provides a foldable display device including a display module in which a panel hole is defined, a first sensor device disposed in the panel hole, a second sensor device, and a panel lower cover which is disposed on a surface of the display module and in which a first cover hole and a second cover hole are defined such that the first sensor device is disposed in the first cover hole and the second sensor device is disposed in the second cover hole, the panel lower cover including a buffer member and a first adhesive member, which attaches the buffer member to the surface of the display module where, in the first cover hole, a minimum distance between the first adhesive member and the first sensor device is greater than a minimum distance between the buffer member and the first sensor device, and in the second cover hole, the first adhesive member overlaps with the second cover hole.

In an embodiment, the panel lower cover may further include a second adhesive member, which is adjacent to the first adhesive member with the buffer member interposed therebetween.

In an embodiment, the second cover hole may penetrate the second adhesive member and the buffer member.

In an embodiment, a minimum distance between the second adhesive member and the first sensor device may be greater than the minimum distance between the buffer member and the first sensor device.

In an embodiment, a minimum distance between the second adhesive member and the second sensor device may be greater than a minimum distance between the buffer member and the second sensor device.

In an embodiment, the second sensor device may be spaced apart from the first adhesive member in a thickness direction of the panel lower cover.

According to the aforementioned and other embodiments of the invention, even when burrs of adhesive members are provided in cover holes of a panel lower cover, the burrs may be prevented from protruding outwardly beyond the cutting plane of a buffer member. Therefore, recognition error that may be caused by the burrs to sensor devices may be prevented, and interference between the sensor devices and the burrs may be prevented.

Other features and embodiments may be apparent from the following detailed description, the drawings, and the claims.

BRIEF DESCRIPTION OF THE DRAWINGS

The above and other embodiments and features of the invention will become more apparent by describing in detail embodiments thereof with reference to the attached drawings, in which.

DETAILED DESCRIPTION

Figure 1:
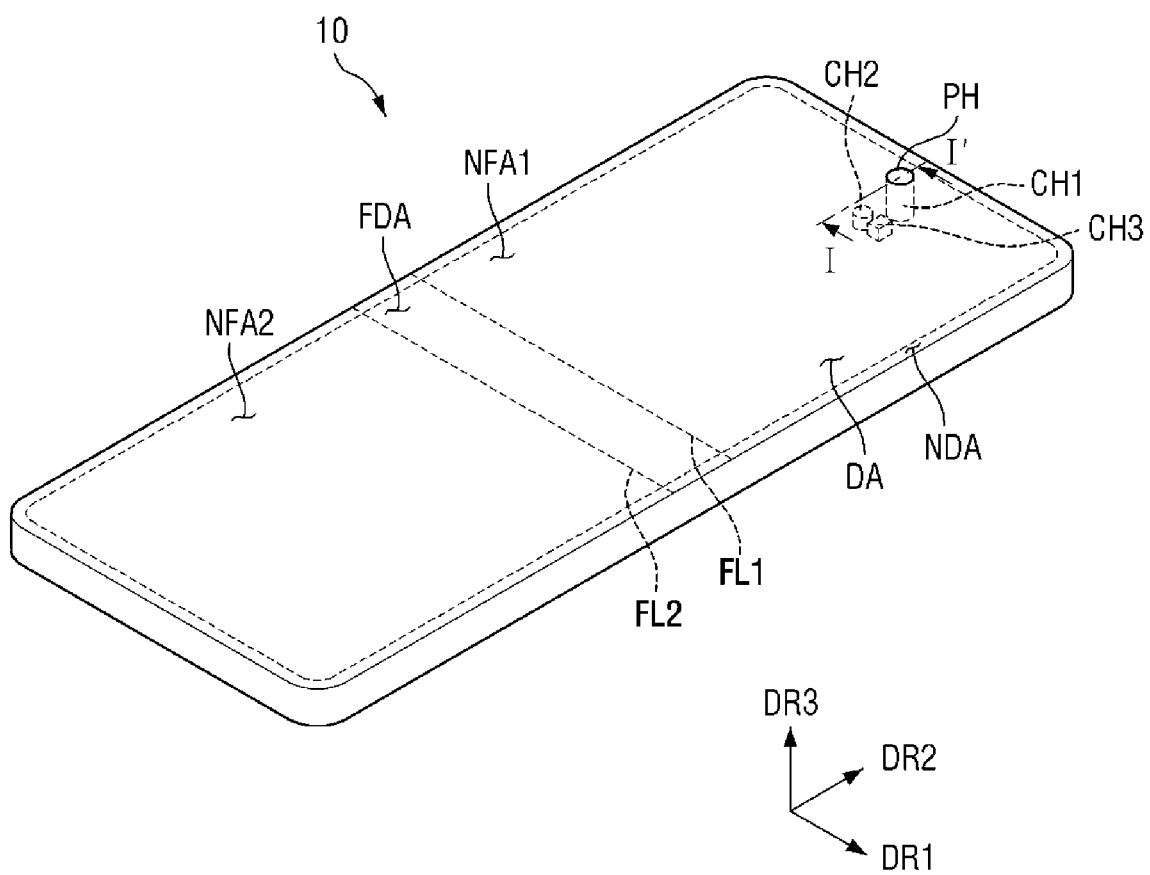
FIG. 1 is a perspective view illustrating an embodiment of the front surface of a foldable display device according to the invention in its unfolded state.

Embodiments of the invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Embodiments of the invention will hereinafter be described with reference to the accompanying drawings.

Figure 2:
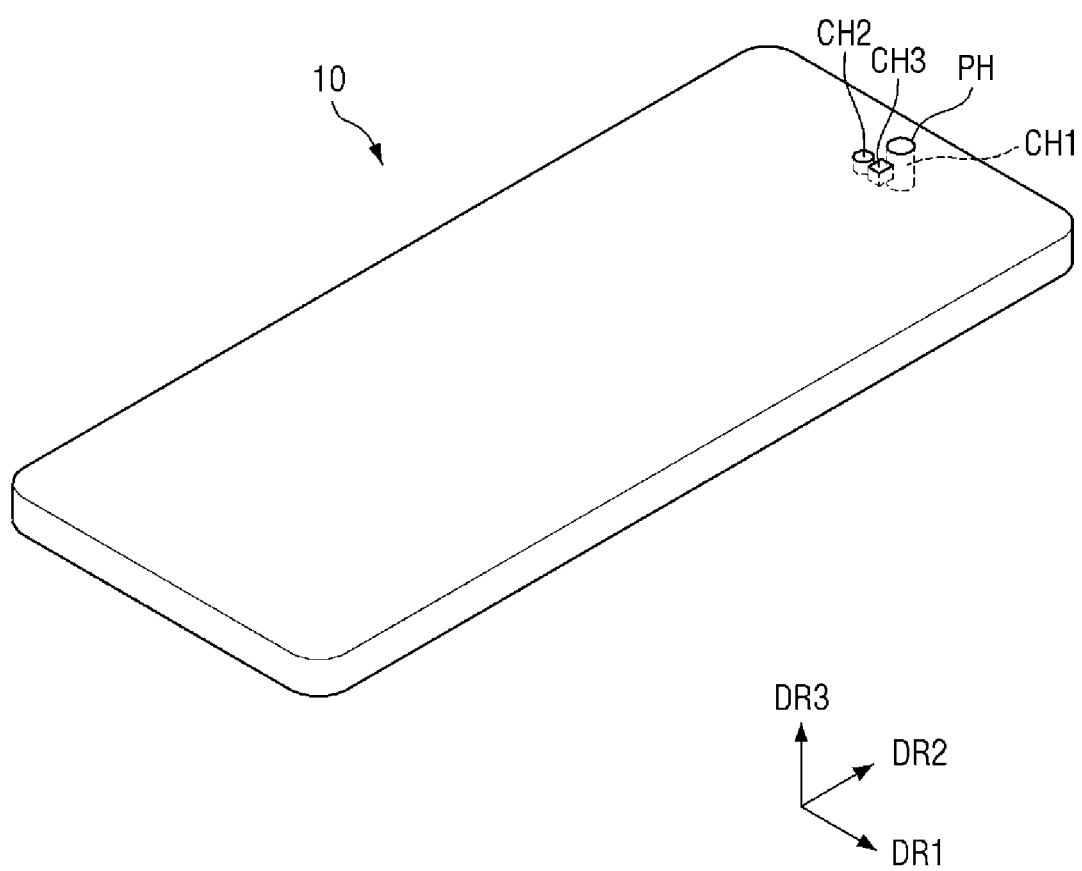
FIG. 2 is a perspective view illustrating an embodiment of the rear surface of the foldable display device according to the invention in its unfolded state.
Figure 3:
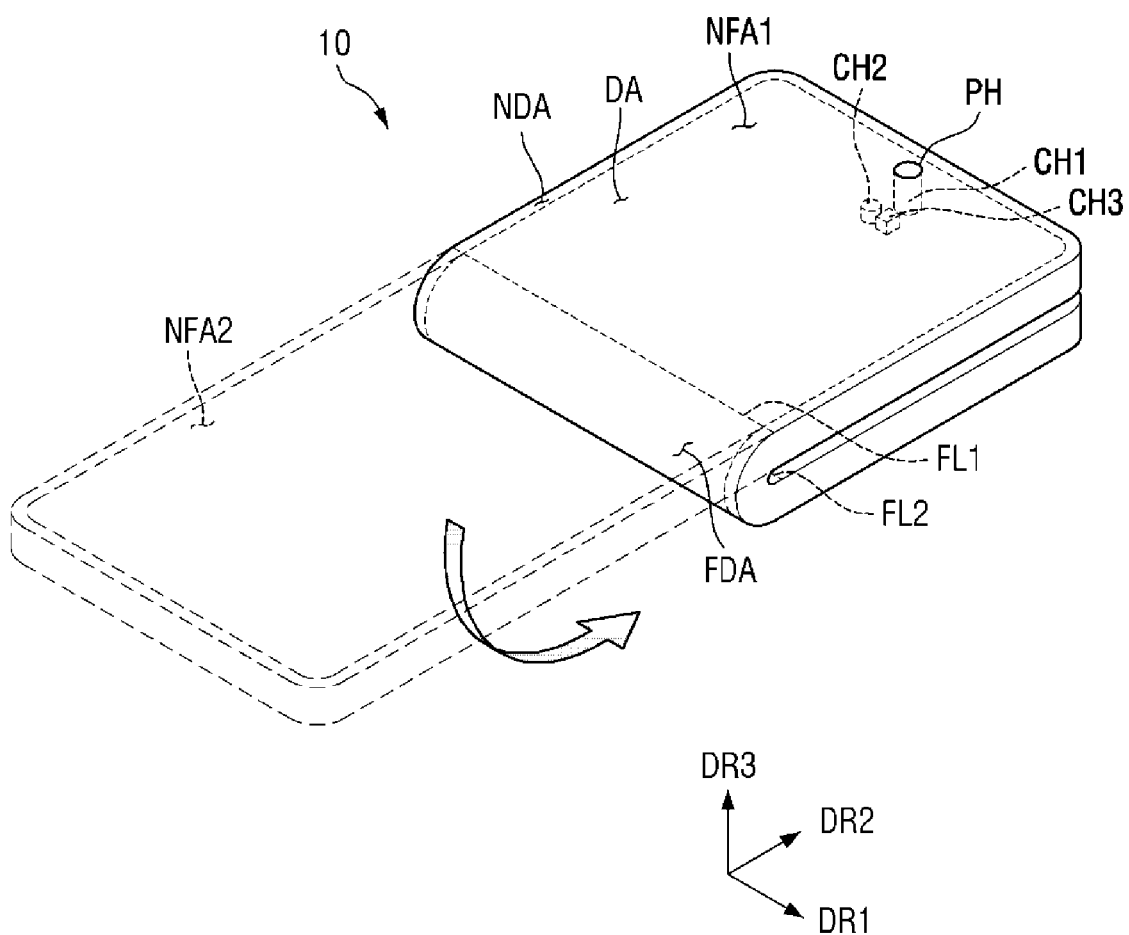
FIG. 3 is a perspective view illustrating an embodiment of the foldable display device according to the invention in its folded state.

FIG. 1 is a perspective view illustrating an embodiment of the front surface of a foldable display device according to the invention in its unfolded state. FIG. 2 is a perspective view illustrating an embodiment of the rear surface of the foldable display device according to the invention in its unfolded state. FIG. 3 is a perspective view illustrating an embodiment of the foldable display device according to the invention in its folded state.

A foldable display device 10 will hereinafter be described as being applied to, for example, a smartphone, but the invention is not limited thereto. In an embodiment, the foldable display device 10 may be applicable not only to a smartphone, but also to a mobile phone, a tablet personal computer ("PC"), a personal digital assistant ("PDA"), a portable multimedia player ("PMP"), a television ("TV"), a gaming console, a wristwatch-type electronic device, a head-mounted display ("HMD"), a PC monitor, a notebook computer, a car navigation device, a car dashboard, a digital camera, a camcorder, an external billboard, an electronic display board, a medical device, a testing device, home appliances such as a refrigerator or a washing machine, or an Internet-of-Things ("IoT") device, for example.

The foldable display device 10 may be classified in various manners according to how it displays an image. In an embodiment, the foldable display device 10 may include an organic light-emitting diode ("OLED") display device, an inorganic electroluminescent ("EL") display device, a quantum-dot light-emitting diode ("QLED") display device, a micro-LED display device, a nano-LED display device, a field emission display ("FED") display device, or an electrophoretic display ("EPD") device, for example. The foldable display device 10 will hereinafter be described as being, for example, an OLED display device, which will hereinafter be referred to simply as a display device, unless otherwise noted. However, the foldable display device 10 is not particularly limited to an OLED display device and may also be applicable to various other display devices.

Referring to FIGS. 1 through 3, a first direction DR1, which is parallel to a first side of the foldable display device 10 in a plan view, may be a horizontal direction of the foldable display device 10, a second direction DR2, which is parallel to a second side of the foldable display device 10 that meets with the first side, may be a vertical direction of the foldable display device 10, and a third direction DR3 may be a thickness direction of the foldable display device 10.

The foldable display device 10 may have a quadrangular (e.g., rectangular or square) shape in a plan view. In an embodiment, the foldable display device 10 may have a rectangular shape with right-angled or rounded corners in a plan view, for example. The foldable display device 10 may have a pair of short sides in the first direction DR1 and a pair of long sides in the second direction DR2 in a plan view.

The foldable display device 10 includes a display area DA and a non-display area NDA. In a plan view, the shape of the display area DA may correspond to the shape of the foldable display device 10. In an embodiment, in a case where the foldable display device 10 has a rectangular shape in a plan view, the display device DA may also have a rectangular shape in a plan view, for example.

The display area DA may be a region that includes a plurality of pixels and thus displays an image. The plurality of pixels may be arranged in rows and columns. The plurality of pixels may have a rectangular, rhombus, or square shape in a plan view, but the invention is not limited thereto. In an alternative embodiment, the plurality of pixels may have a quadrangular shape other than a rectangular, rhombus, or square shape, another polygonal shape, or a circular shape, or an elliptical shape in a plan view.

The non-display area NDA may be a region that does not include pixels and thus does not display an image. The non-display area NDA may be disposed around the display area DA. The non-display area NDA may surround the display area DA, as illustrated in FIGS. 1 and 3, but the invention is not limited thereto. The display area DA may be surrounded only in part by the non-display area NDA.

At least one panel hole PH may be defined in a front surface of the foldable display device 10. The panel hole PH may be defined in the display area DA. The panel hole PH may be surrounded by the display area DA, as illustrated in FIGS. 1 and 3, but the invention is not limited thereto. The panel hole PH may be surrounded only in part by the display area DA. In this case, a portion of the panel hole PH may be surrounded by the display area DA, and another portion of the panel hole PH may be surrounded by the non-display area NDA.

As illustrated in FIGS. 1 and 2, a plurality of cover holes (CH1, CH2, and CH3) may be defined in the rear surface of the foldable display device 10. The cover holes (CH1, CH2, and CH3) may include first, second, and third cover holes CH1, CH2, and CH3. The first, second, and third cover holes CH1, CH2, and CH3 may be defined in the rear surface of the foldable display device 10 to overlap with the display area DA. The first, second, and third cover holes CH1, CH2, and CH3 may be invisible at the front of the foldable display device 10, but may be visible at the rear of the foldable display device 10. The first cover hole CH1 may overlap and communicate with the panel hole PH. That is, the panel hole PH and the first cover hole CH1 may be defined as one hole.

Sensor devices may be disposed in the panel hole PH, the first cover hole CH1, the second cover hole CH2, and the third cover hole CH3. In an embodiment, the sensor devices may be optical sensor devices capable of sensing light, such as a camera sensor, an illumination sensor, a proximity sensor, and the like.

The panel hole PH, the first cover hole CH1, the second cover hole CH2, and the third cover hole CH3 may have the same size as one another, but the invention is not limited thereto. In an alternative embodiment, the panel hole PH, the first cover hole CH1, the second cover hole CH2, and the third cover hole CH3 may have different sizes from one another. Identical sensor devices may be disposed in the panel hole PH, the first cover hole CH1, the second cover hole CH2, and the third cover hole CH3, but the invention is not limited thereto. In an alternative embodiment, different sensor devices may be disposed in the panel hole PH, the first cover hole CH1, the second cover hole CH2, and the third cover hole CH3. In an embodiment, camera sensors may be disposed in the panel hole PH and the first cover hole CH1, an illumination sensor may be disposed in the second cover hole CH2, and a proximity sensor may be disposed in the third cover hole CH3, for example.

The panel hole PH, the first cover hole CH1, the second cover hole CH2, and the third cover hole CH3 may have a circular or polygonal shape in a plan view, as illustrated in FIGS. 1 through 3, but the invention is not limited thereto. In an embodiment, as illustrated in FIGS. 1 through 3, the panel hole PH, the first cover hole CH1, and the second cover hole CH2 may have a circular shape, and the third cover hole CH3 may have a rectangular shape, for example. In an alternative embodiment, the panel hole PH, the first cover hole CH1, the second cover hole CH2, and the third cover hole CH3 may all have a circular shape or a polygonal shape such as a rectangular shape.

FIGS. 1 through 3 illustrate that one panel hole PH and three cover holes, i.e., the first, second, and third cover holes CH1, CH2, and CH3 are defined in the foldable display device 10, but the invention is not limited thereto. In an alternative embodiment, a plurality of panel holes PH and a plurality of cover holes (CH1, CH2, and CH3) may be defined in the foldable display device 10.

The foldable display device 10 may be in a folded state or in an unfolded state. The foldable display device 10 may be out-folded so that the display area DA may be disposed on the outside, as illustrated in FIG. 3. When the foldable display device 10 is out-folded, parts of the bottom surface of the foldable display device 10 may face each other.

The foldable display device 10 may include a folding area FDA, a first non-folding area NFA1, and a second non-folding area NFA2. The folding area FDA may be a region where the foldable display device 10 is folded, and the first and second non-folding areas NFA1 and NFA2 may be regions where the foldable display device 10 is not folded.

The first non-folding area NFA1 may be disposed on one side (e.g., the upper side) of the folding area FDA. The second non-folding area NFA2 may be on the other side (e.g., the lower side) of the folding area FDA. The folding area FDA may be a region that is bent at a predetermined curvature between first and second folding lines FL1 and FL2. The first folding line FL1 may be the boundary between the folding area FDA and the first non-folding area NFA1, and the second folding line FL2 may be the boundary between the folding area FDA and the second non-folding area NFA2.

As illustrated in FIGS. 1 and 3, the first and second folding lines FL1 and FL2 may extend in the first direction DR1, and the foldable display device 10 may be folded in the second direction DR2. As a result, the length, in the second direction DR2, of the foldable display device 10 may be reduced to about half so that a user may carry the foldable display device 10 around with ease and convenience.

The direction in which the first and second folding lines FL1 and FL2 extend is not limited to the first direction DR1. That is, in an alternative embodiment, the first and second folding lines FL1 and FL2 may extend in the second direction DR2, and the foldable display device 10 may be folded in the first direction DR1. In this case, the length, in the first direction DR1, of the foldable display device 10 may be reduced to about half. In an alternative embodiment, the first and second folding lines FL1 and FL2 may extend in a diagonal direction. In this case, the foldable display device 10 may be folded into the shape of a triangle.

FIGS. 1 and 3 illustrate that each of the display area DA and the non-display area NDA overlaps with the folding area FDA, the first non-folding area NFA1, and the second non-folding area NFA2, but the invention is not limited thereto. In an alternative embodiment, each of the display area DA and the non-display area NDA overlaps with at least one of the folding area FDA, the first non-folding area NFA1, and the second non-folding area NFA2.

A panel hole PH is illustrated as being defined in the first non-folding area NFA1, but the invention is not limited thereto. In an alternative embodiment, the panel hole PH may be defined in at least one of the first and second non-folding areas NFA1 and NFA2.

Figure 4:
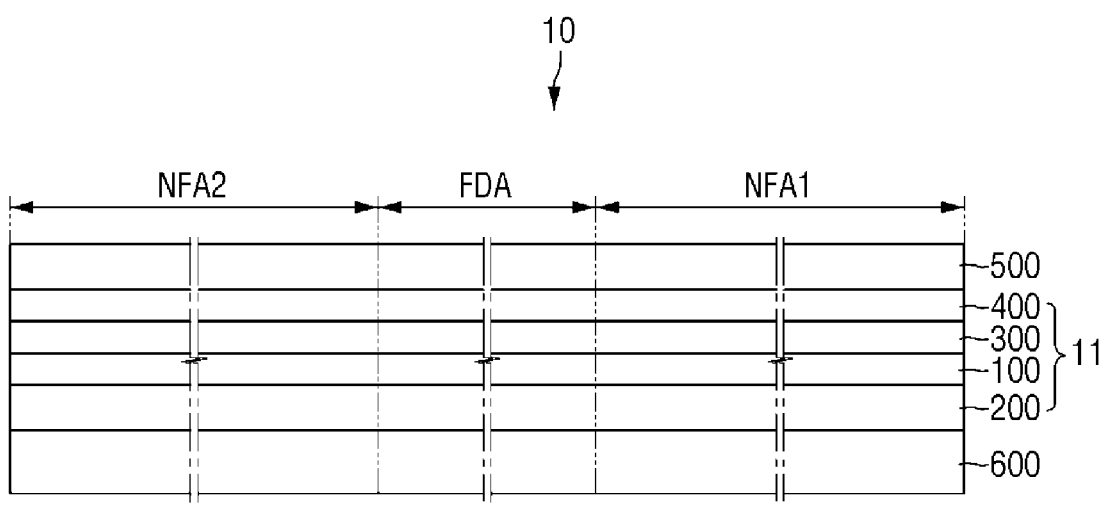
FIG. 4 is a side view illustrating an embodiment of the foldable display device according to the invention in its unfolded state.
Figure 5:
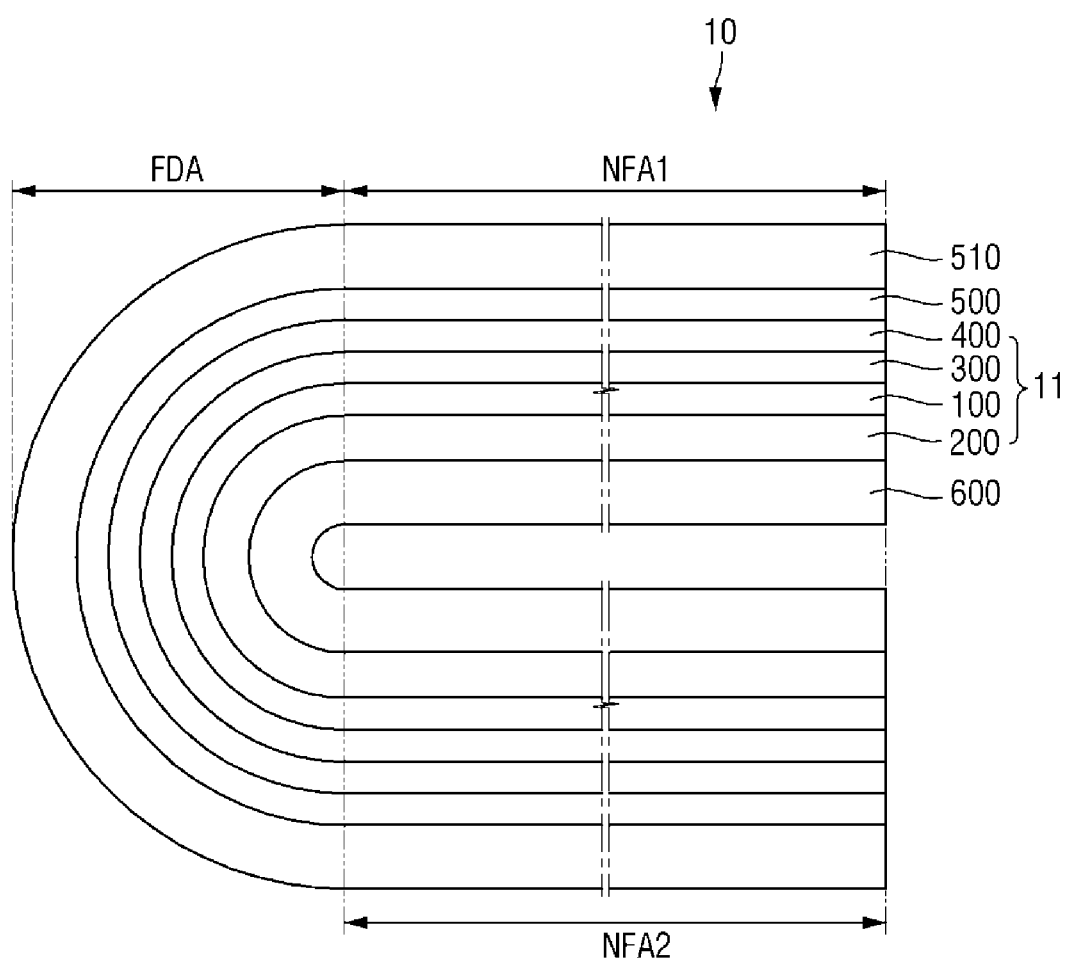
FIG. 5 is a side view illustrating an embodiment of the foldable display device according to the invention in its folded state.

FIG. 4 is a side view illustrating an embodiment of the foldable display device according to the invention in its unfolded state. FIG. 5 is a side view illustrating an embodiment of the foldable display device according to the invention in its folded state.

Referring to FIGS. 4 and 5, the foldable display device 10 may include a display module 11, a window member 500, a window protective layer 510, and a panel lower cover 600.

The window member 500 may be disposed on a surface of the display module 11. In an embodiment, the surface of the display module 11 may be the top surface of the display module 11, for example. The window member 500 may cover the surface of the display module 11 and may thus protect the display module 11. In an embodiment, the window member 500 may include a transparent material such as glass, particularly, ultra-thin glass ("UTG") having a thickness of about 0.1 millimeter (mm) or less. The window member 500 may include plastic such as a transparent polyimide ("PI") film, but the invention is not limited thereto.

The window protective layer 510 may be disposed on a surface of the window member 500. The surface of the window member 500 may be the top surface of the window member 500. The window protective layer 510 may perform at least one of a scatter prevention function, a shock-absorbing function, a dent prevention function, an anti-fingerprint function, and an anti-glare function.

The panel lower cover 600 may be disposed on a second surface of the display module 11 that is opposite to the surface of the display module 11. The second surface of the display module 11 may be the bottom surface of the display module 11. FIGS. 4 and 5 illustrate that the panel lower cover 600 is disposed in the folding area FDA, but the invention is not limited thereto. In an alternative embodiment, the panel lower cover 600 may be removed from the folding area FDA so that the display device 10 is smoothly foldable.

The panel lower cover 600 may include at least one of a light-blocking member for absorbing light incident from the outside, a buffer member for absorbing shock from the outside, and a heat dissipation member for efficiently releasing heat from the display panel 100.

The light-blocking member may be disposed below the display panel 100. The light-blocking member blocks the transmission of light and thereby prevents elements disposed therebelow from becoming visible from the top of the display panel 100. In an embodiment, the light-blocking member may include a light-absorbing material such as a black pigment or a black dye.

The buffer member may be disposed below the light-blocking member. The buffer member absorbs an external shock and thereby prevents damage to the display panel 100. The buffer member may consist of a single layer or multiple layers. In an embodiment, the buffer member may include a polymer resin such as polyurethane ("PU"), polycarbonate ("PC"), polypropylene ("PP"), or polyethylene ("PE") or an elastic material such as a foam sponge foamed with rubber, a urethane-based material, or an acrylic material, for example.

The heat dissipation member may be disposed below the buffer member. In an embodiment, the heat dissipation member may include a first heat dissipation layer, which includes graphite or carbon nanotubes, and a second heat dissipation layer, which is provided as a thin metallic film including a metal with excellent thermal conductivity such as copper, nickel, ferrite, or silver.

The display module 11 may include a display panel 100, a protective layer 200, a polarizer layer 300, and a shock-absorbing layer 400.

The display panel 100, which is a panel for displaying an image, may be an OLED display panel using OLEDs, a QLED display panel including a quantum-dot light-emitting layer, an inorganic EL display panel including an inorganic semiconductor, or a micro-LED display panel using micro-LEDs. The display panel 100 has been described as being, for example, an OLED display panel, but the invention is not limited thereto. The display panel 100 will be described later with reference to FIG. 9.

The protective layer 200 may be disposed on a first surface of the display panel 100. The first surface of the display panel 100 may be the bottom surface of the display panel 100. FIGS. 4 and 5 illustrate that the protective layer 200 is disposed in the folding area FDA, but the invention is not limited thereto. In an alternative embodiment, the protective layer 200 may be removed from the folding area FDA so that the display device 10 is smoothly foldable. The protective layer 200 may be a polymer layer. In an embodiment, the protective layer 200 may include PI, polyethylene terephthalate ("PET"), polycarbonate ("PC"), polyethylene ("PE"), polypropylene ("PP"), polysulfone ("PSF"), polymethyl methacrylate ("PMMA"), triacetyl cellulose ("TAC"), or a cycloolefin polymer ("COP"), for example.

The polarizer layer 300 may be disposed on a second surface of the display panel 100 that is opposite to the first surface of the display panel 100. The second surface of the display panel 100 may be the top surface of the display panel 100. The polarizer layer 300 may include a linear polarizer plate and a phase delay film such as a quarter-wave plate. In this case, the phase delay film may be disposed on the display panel 100, and the linear polarizer plate may be disposed on the phase delay film.

The shock-absorbing layer 400 may enhance the durability of the window member 500 and may improve optical performance. In an embodiment, the shock-absorbing layer 400 may include PI, PET, PC, PE, PP, PSF, PMMA, TAC, or a COP, for example. The shock-absorbing layer 400 may not be provided.

When the display device 10 is out-folded, as illustrated in FIG. 5, the display panel 100, the protective layer 200, the polarizer layer 300, the shock-absorbing layer 400, the window member 500, the window protective layer 510, and the panel lower cover 600 of the display device 10 may be folded in the folding area FDA.

Figure 6:
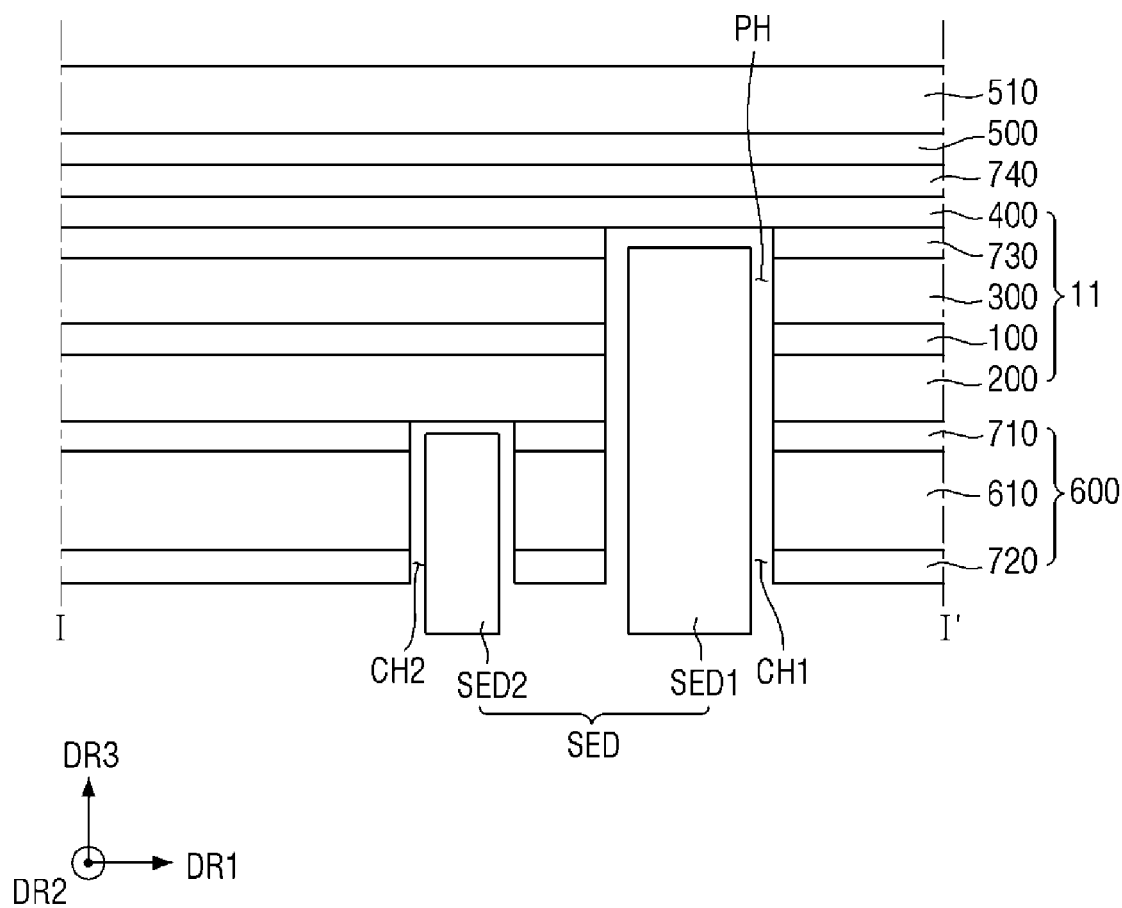
FIG. 6 is a cross-sectional view taken along line I-I' of FIG. 1.

FIG. 6 is a cross-sectional view taken along line I-I' of FIG. 1.

Referring to FIG. 6, the panel lower cover 600 may include a buffer member 610, a first adhesive member 710, which is disposed on a first surface of the buffer member 610, and a second adhesive member 720, which is disposed on a second surface of the buffer member 610.

The buffer member 610 may absorb shock from the outside and may improve the durability of the display device 10. In an embodiment, the buffer member 610 may include rubber, PU, PI, PET, PC, PE, PP, PSF, PMMA, TAC, or a COP, for example. In an embodiment, the buffer member 610 may include foam such as PU foam. The first adhesive member 710, which bonds the panel lower cover 600 and the protective layer 200, may be disposed between the buffer member 610 and the protective layer 200. The second adhesive member 720, which bonds a lower plate (not illustrated) and the panel lower cover 600, may be disposed between the buffer member 610 and the lower plate.

A third adhesive member 730 may be disposed between the polarizer layer 300 and the shock-absorbing layer 400 and may be attached to the polarizer layer 300 and the shock-absorbing layer 400. A fourth adhesive member 740 may be disposed between the shock-absorbing layer 400 and the window member 500 and may be attached to the shock-absorbing layer 400 and the window member 500. Also, another adhesive member may be further disposed between the protective layer 200 and the display panel 100 and/or between the display panel 100 and the polarizer layer 300.

In an embodiment, the first, second, third, and fourth adhesive members 710, 720, 730, and 740 may be pressure sensitive adhesives ("PSAs").

The panel hole PH may penetrate the display module 11. The panel hole PH may be a hole that penetrates the display panel 100, the protective layer 200, the polarizer layer 300, and the third adhesive member 730 of the display module 11.

The first and second cover holes CH1 and CH2 may be defined in the panel lower cover 600. The first and second cover holes CH1 and CH2 may be holes that penetrate the panel lower cover 600. The first cover hole CH1 may penetrate the first adhesive member 710, the buffer member 610, and the second adhesive member 720. The first cover hole CH1 may overlap and communicate with the panel hole PH. The second cover hole CH2 may be spaced apart from the first cover hole CH1 and may penetrate the first adhesive member 710, the buffer member 610, and the second adhesive member 720.

Sensor devices SED may be disposed in the panel hole PH, the first cover hole CH1, and the second cover hole CH2. The sensor devices SED may include first and second sensor devices SED1 and SED2. The first sensor device SED1 may be inserted in the panel hole PH and the first cover hole CH1, but may be spaced apart from the display panel 100, the protective layer 200, the polarizer layer 300, the shock-absorbing layer 400, and the third adhesive member 730 of the display module 11. The second sensor device SED2 may be inserted in the second cover hole CH2, but may be spaced apart from the first adhesive member 710, the buffer member 610, and the second adhesive member 720 of the panel lower cover 600. The first sensor device SED1 may be disposed at the centers of the panel hole PH and the first cover hole CH1, and the second sensor device SED2 may be disposed at the center of the second cover hole CH2.

In an embodiment, the first sensor device SED1 may be a camera sensor, for example. As the first sensor device SED1 is closer to the window member 500, a greater amount of light is incident through the panel hole PH. The first sensor device SED1 may overlap with the display panel 100, the protective layer 200, the polarizer layer 300, the third adhesive member 730, the buffer member 610, the first adhesive member 710, and the second adhesive member 720 in the first direction DR1.

In an embodiment, the second sensor device SED2 may be a proximity sensor or an illumination sensor. The second sensor device SED2 may overlap with the buffer member 610, the first adhesive member 710, and the second adhesive member 720 in the first direction DR1.

The panel hole PH may be defined by cutting the protective layer 200, the display panel 100, the polarizer layer 300, and the third adhesive member 730 through laser cutting. The first and second cover holes CH1 and CH2 may be defined in the panel lower cover 600 by cutting the first adhesive member 710, the buffer member 610, and the second adhesive member 720 through laser cutting. The panel lower cover 600 where the first and second cover holes CH1 and CH2 are defined may be attached to a surface of the protective layer 200 of the display module 11 so that the panel hole PH and the first cover hole CH1 may overlap with each other, and that the inner circumferential surfaces of the panel hole PH and the first cover hole CH1 may be arranged continuously.

Figure 7:
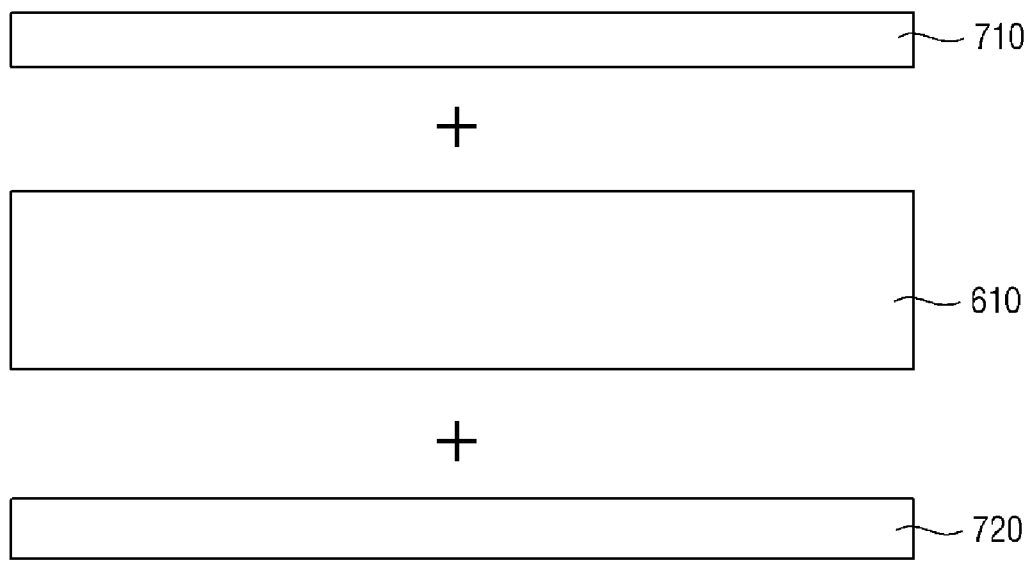
FIGS. 7 through 9 are cross-sectional views illustrating an embodiment of fabricating a panel lower cover according to the invention.
Figure 8:
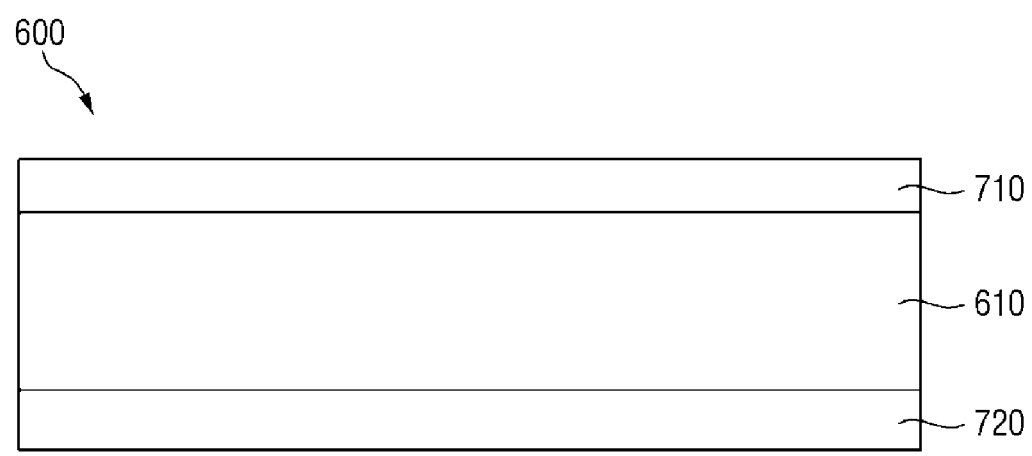
Figure 9:
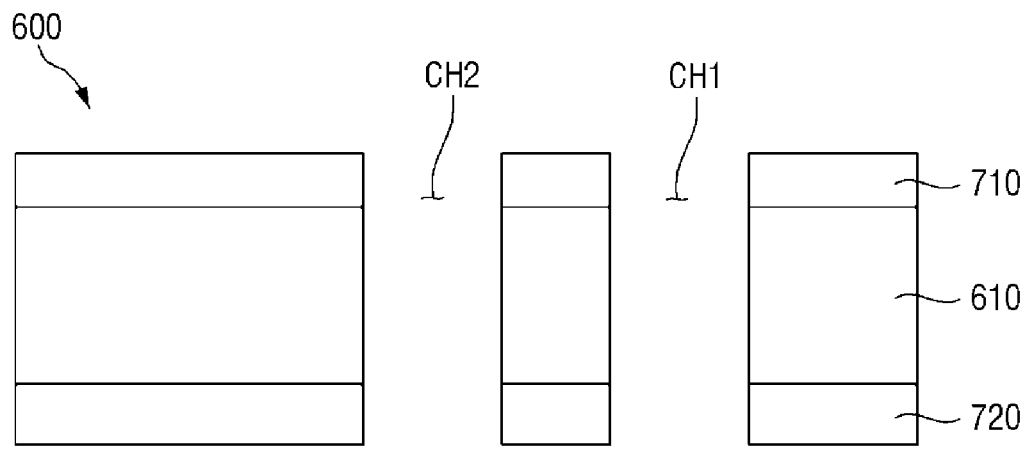
Figure 10:
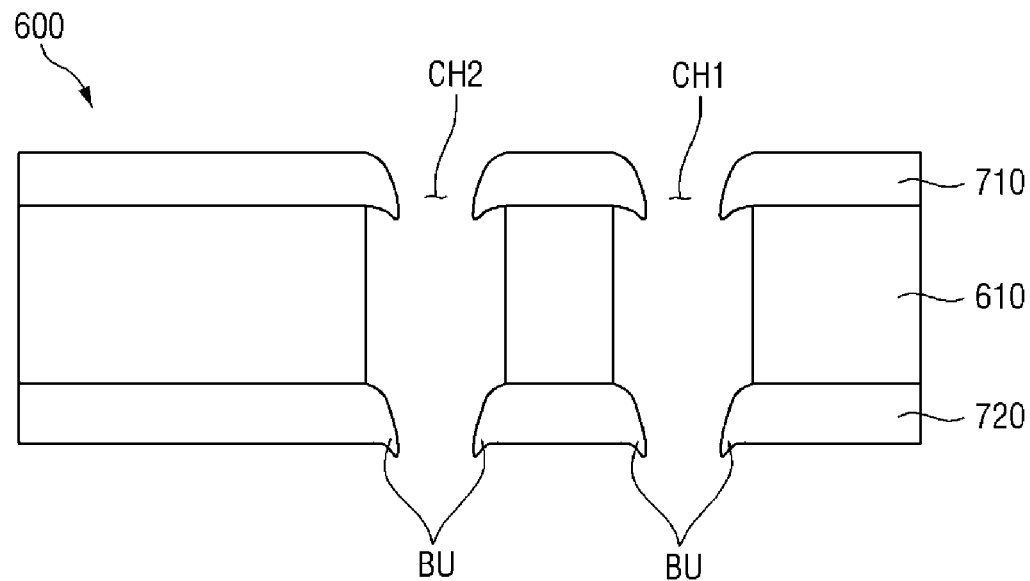
FIG. 10 is a cross-sectional view of an embodiment of the panel lower cover according to the invention.
Figure 11:
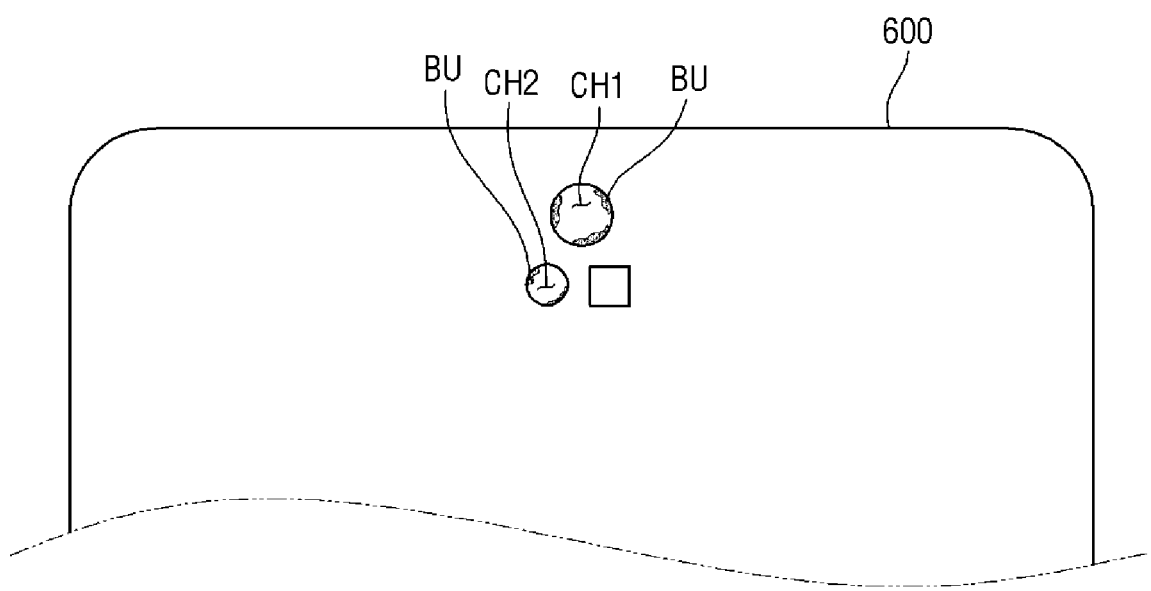
FIG. 11 is a plan view of an embodiment of the panel lower cover according to the invention.
Figure 12:
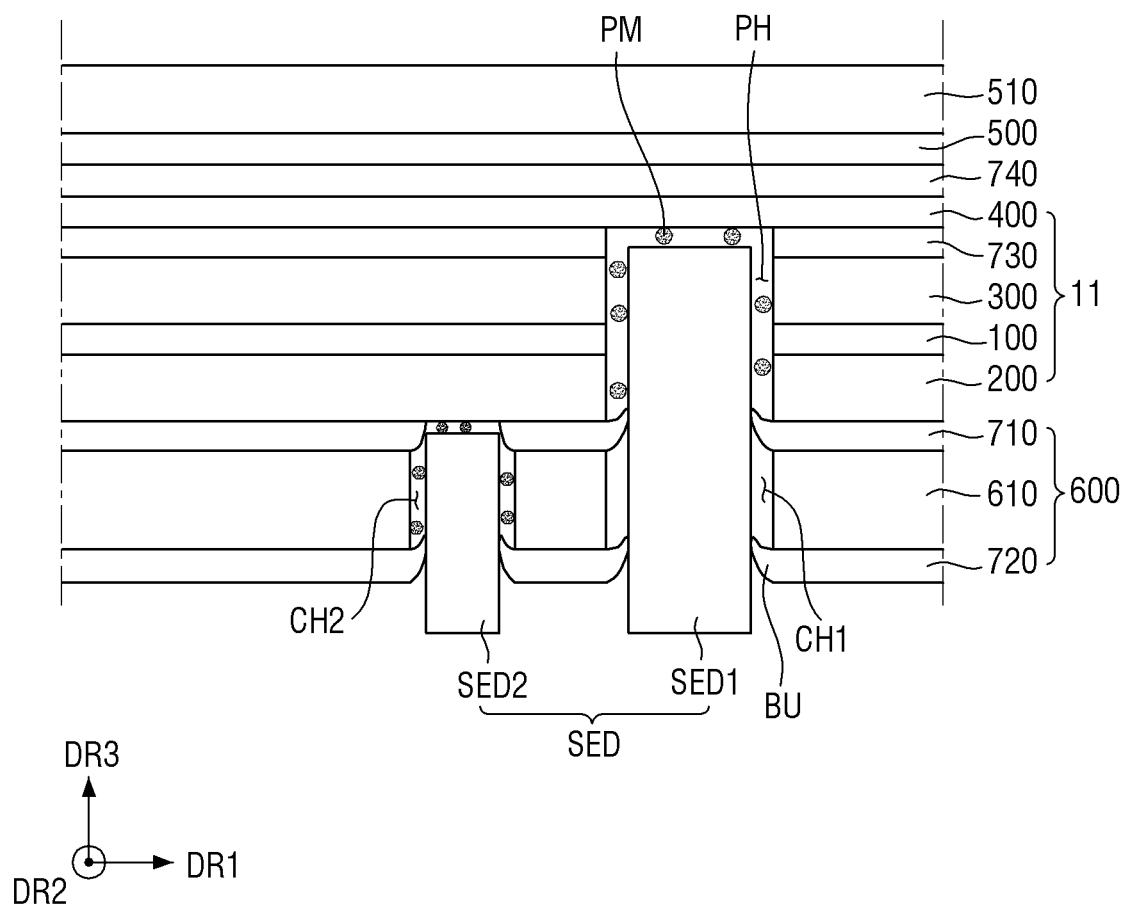
FIG. 12 is a cross-sectional view of an embodiment of a display device with the panel lower cover attached thereto according to the invention.

FIGS. 7 through 9 are cross-sectional views illustrating an embodiment of fabricating a panel lower cover according to the invention. FIG. 10 is a cross-sectional view of an embodiment of the panel lower cover according to the invention. FIG. 11 is a plan view of the panel lower cover. FIG. 12 is a cross-sectional view of an embodiment of a display device with the panel lower cover according to the invention attached thereto.

Referring to FIGS. 7 and 8, the first adhesive member 710, the second adhesive member 720, and the buffer member 610 are prepared. The first adhesive member 710, the second adhesive member 720, and the buffer member 610 may be prepared as films.

Thereafter, the first and second adhesive members 710 and 720 are attached to the first and second surfaces, respectively, of the buffer member 610, thereby fabricating the panel lower cover 600. The first adhesive member 710 may be attached to the top surface of the buffer member 610, and the second adhesive member 720 may be attached to the bottom surface of the buffer member 610.

Thereafter, referring to FIG. 9, the first and second cover holes CH1 and CH2 are defined in one region of the panel lower cover 600 to be spaced apart from each other. The first and second cover holes CH1 and CH2 may be defined by cutting the first adhesive member 710, the buffer member 610, and the second adhesive member 720 through laser cutting. The first and second cover holes CH1 and CH2 may be defined to be adjacent to, but spaced apart from, each other.

Referring to FIG. 10, the first and second cover holes CH1 and CH2 may be defined in the panel lower cover 600. The first and second adhesive members 710 and 720 may be provided as PSAs. When the first and second cover holes CH1 and CH2 are defined through laser cutting, burrs protrude from the cutting planes of the first and second adhesive members 710 and 720. Referring to FIG. 11, burrs BU are provided in the first and second cover holes CH1 and CH2 of the panel lower cover 600.

The burrs BU, which are provided on the cutting planes of the first and second adhesive members 710 and 720, may interfere with the first and second sensor devices SED1 and SED2, as illustrated in FIG. 12. Also, foreign materials PM may be attached to the burrs BU, which have adhesiveness. Thus, when the first and second sensor devices SED1 and SED2 are inserted in the panel hole PH, the first cover hole CH1, and the second cover hole CH2, the foreign materials PM, attached to the burrs BU, may be inserted together with the first and second sensor devices SED1 and SED2 so that recognition error may be caused to the first and second sensor devices SED1 and SED2.

Figure 13:
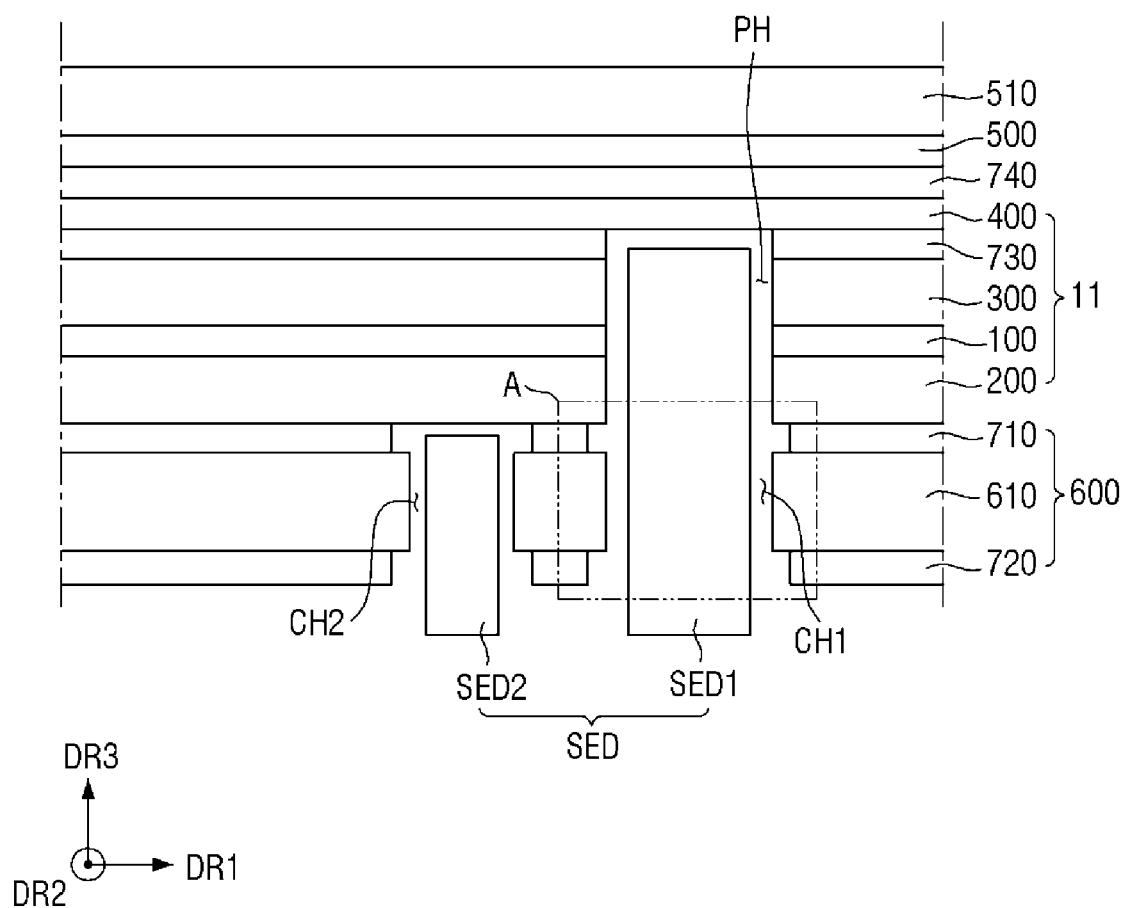
FIG. 13 is a cross-sectional view illustrating another embodiment of a panel hole and first and second cover holes of a foldable display device according to the invention.
Figure 14:
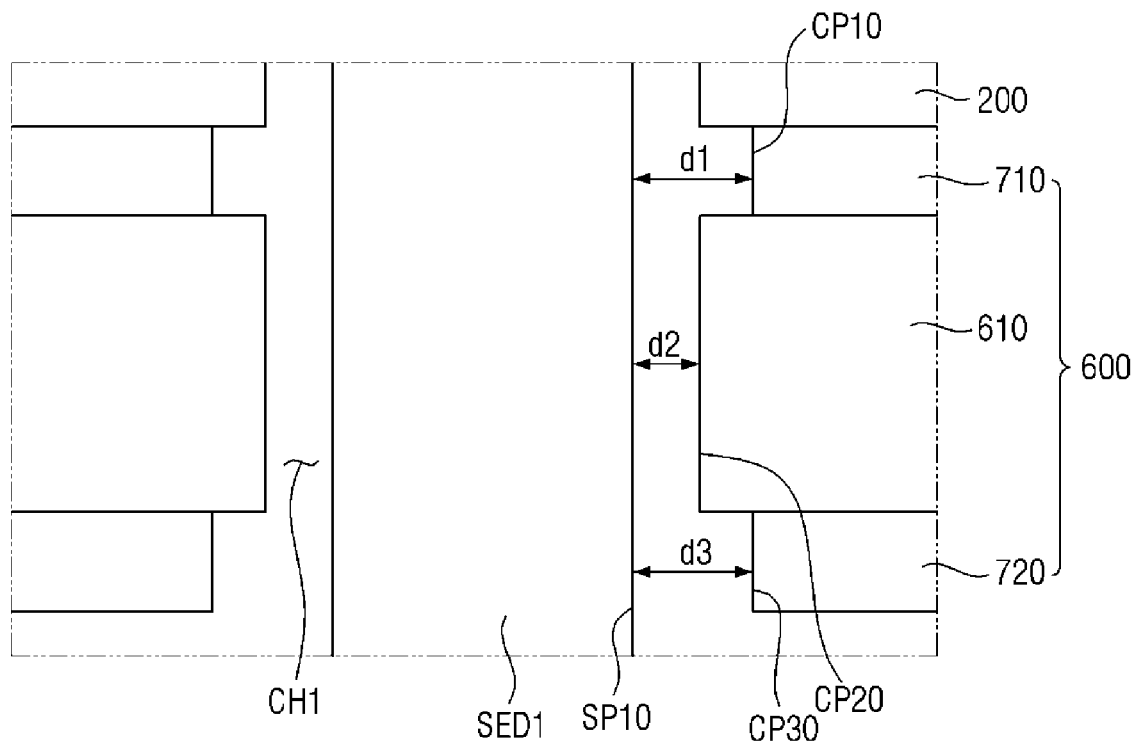
FIG. 14 is an exemplary cross-sectional view illustrating an area A of FIG. 13.
Figure 15:
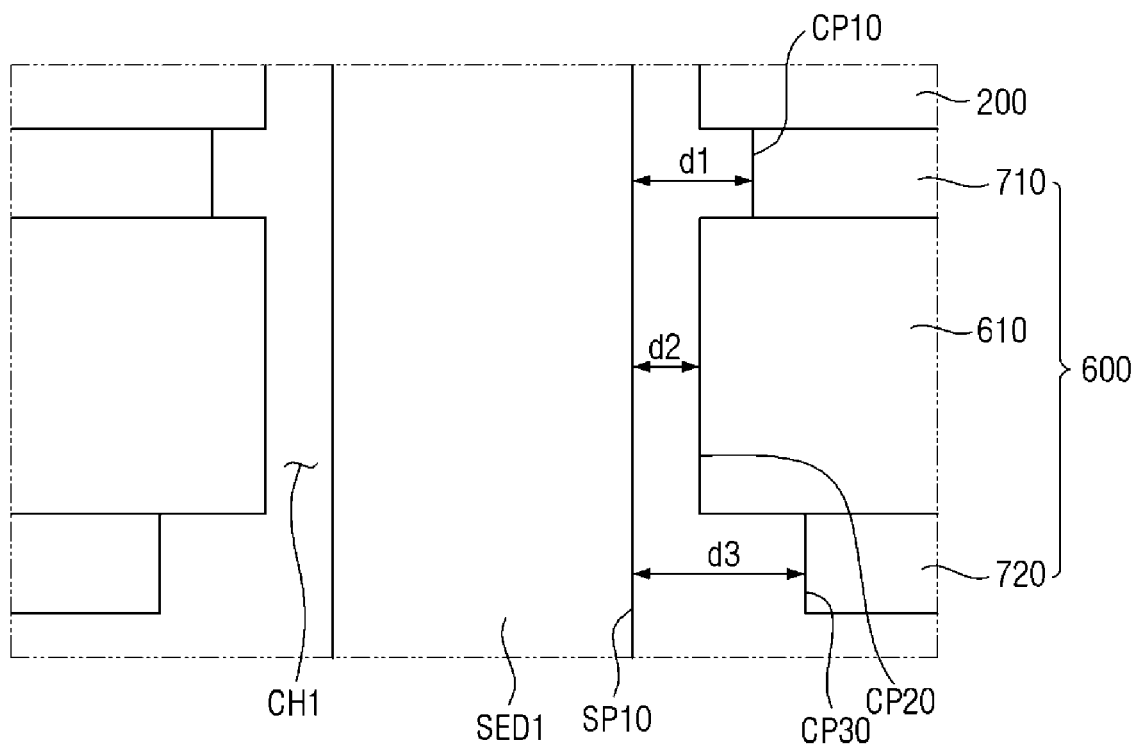
FIG. 15 is another exemplary cross-sectional view illustrating the area A of FIG. 13.
Figure 16:
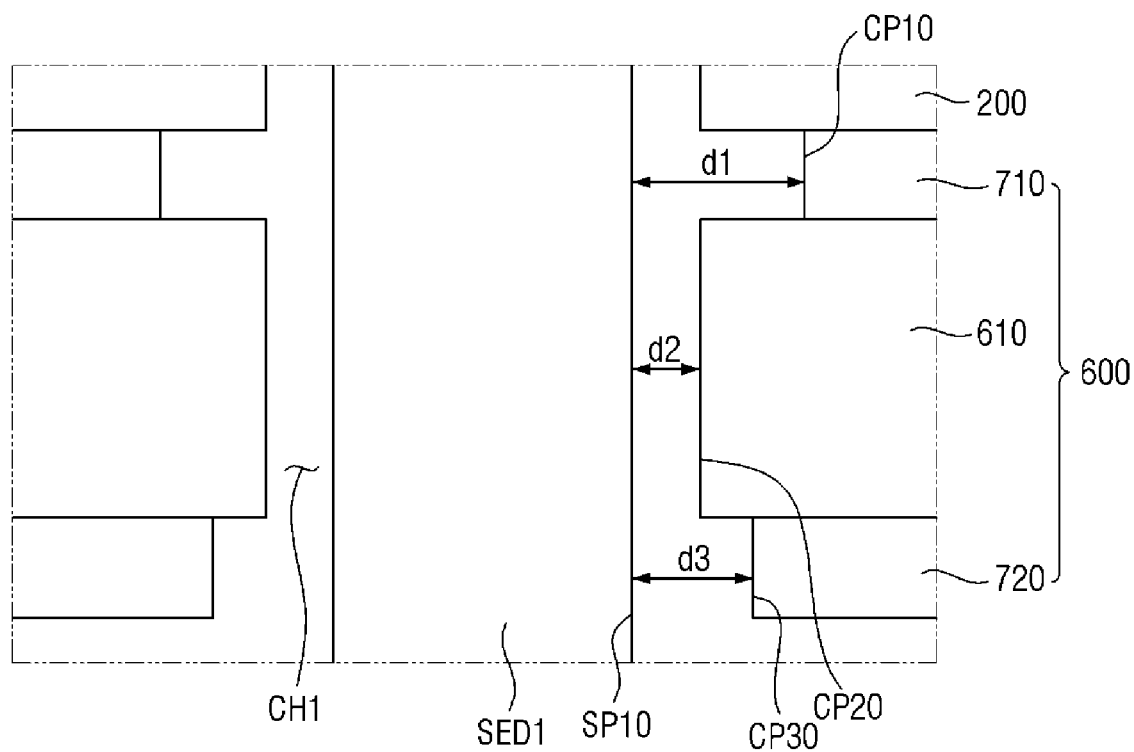
FIG. 16 is another exemplary cross-sectional view illustrating the area A of FIG. 13.
Figure 17:
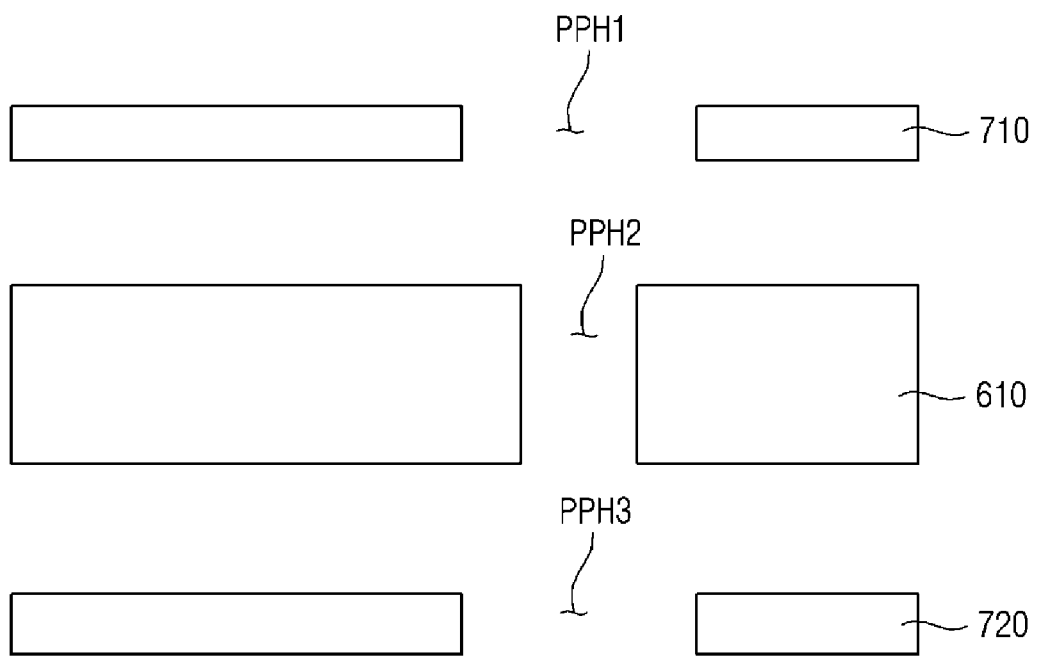
FIGS. 17 and 18 are cross-sectional views illustrating another embodiment of fabricating a panel lower cover according to the invention.
Figure 18:
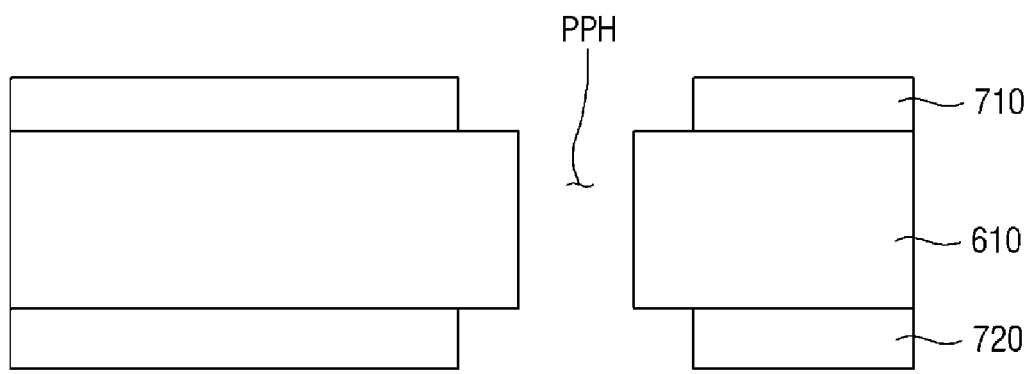
Figure 19:
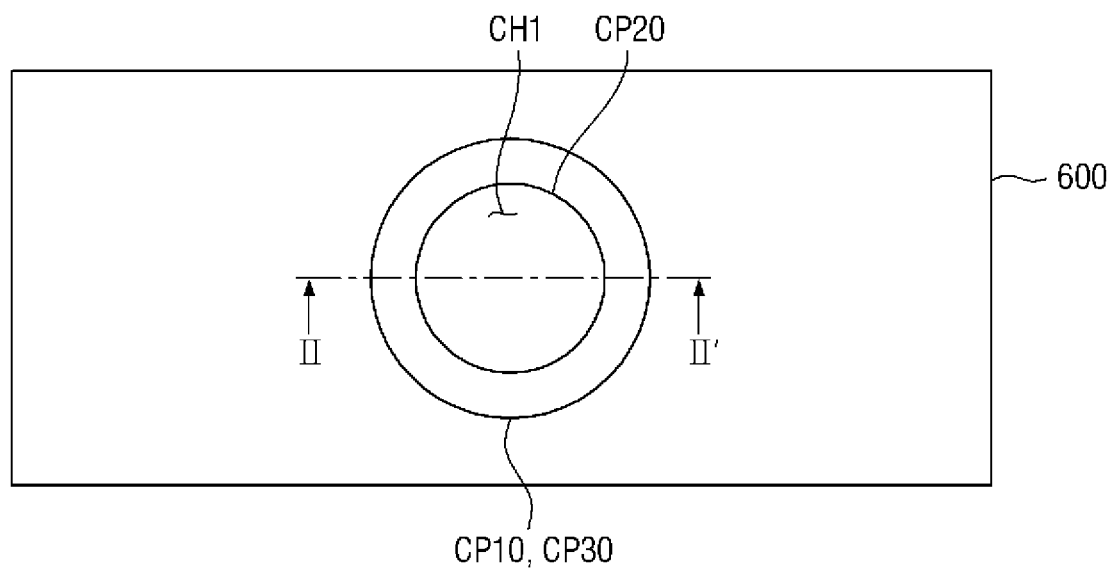
FIG. 19 is a plan view illustrating a first cover hole of the panel lower cover of FIGS. 17 and 18.
Figure 20:
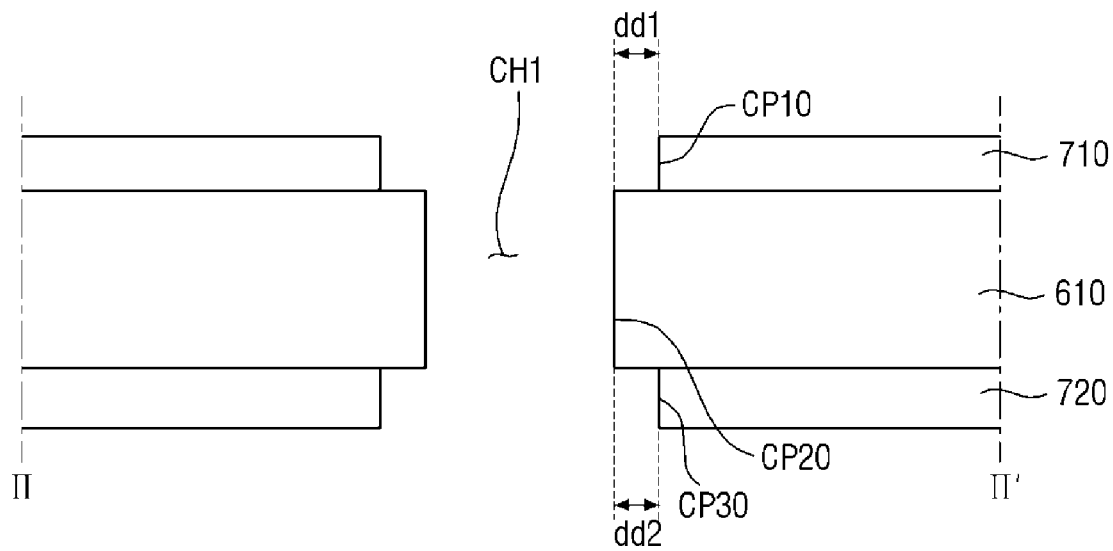
FIG. 20 is a cross-sectional view taken along line II-IF of FIG. 19.
Figure 21:
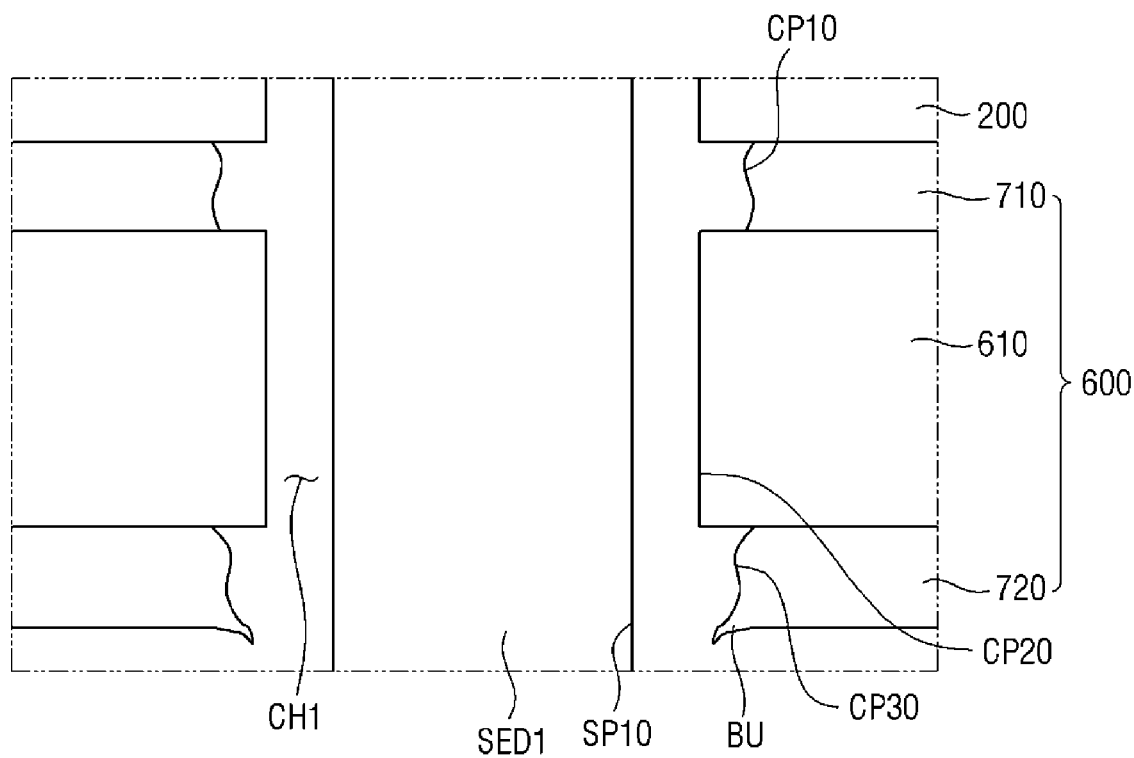
FIG. 21 is a cross-sectional view illustrating the first cover hole of the panel lower cover of FIGS. 17 and 18 where burrs of first and second adhesive members are provided.

FIG. 13 is a cross-sectional view illustrating another embodiment of a panel hole and first and second cover holes of a foldable display device according to the invention. FIG. 14 is an exemplary cross-sectional view illustrating an area A of FIG. 13. FIG. 15 is another exemplary cross-sectional view illustrating the area A of FIG. 13. FIG. 16 is another exemplary cross-sectional view illustrating the area A of FIG. 13. FIGS. 17 and 18 are cross-sectional views illustrating another embodiment of fabricating a panel lower cover according to the invention. FIG. 19 is a plan view illustrating a first cover hole of the panel lower cover of FIGS. 17 and 18. FIG. 20 is a cross-sectional view taken along line II-IF of FIG. 19. FIG. 21 is a cross-sectional view illustrating the first cover hole of the panel lower cover of FIGS. 17 and 18 where burrs of first and second adhesive members are provided.

The embodiment of FIGS. 13 through 16 differs from the embodiment of FIGS. 6 through 12 in that the distance between a first adhesive member 710 and a first sensor device SED1 is greater than the distance between a buffer member 610 and the first sensor device SED1. The configuration of a first cover hole CH1 will hereinafter be described, but the following description of the configuration of the first cover hole CH1 may also be directly applicable to the configuration of a second cover hole CH2.

Referring to FIGS. 13 and 14, a minimum distance d1 between the first adhesive member 710 of a panel lower cover 600 and the first sensor device SED1 may be greater than a minimum distance d2 between the buffer member 610 and the first sensor device SED1. A minimum distance d3 between a second adhesive member 720 of the panel lower cover 600 and the first sensor device SED1 may be greater than the minimum distance d2 between the buffer member 610 and the first sensor device SED1. The minimum distance d1 between the first adhesive member 710 and the first sensor device SED1 may be the same as the minimum distance d3 between the second adhesive member 720 and the first sensor device SED1.

Specifically, a cutting plane CP10 of the first adhesive member 710, a cutting plane CP30 of the second adhesive member 720, and a cutting plane CP20 of the buffer member 610 that form a sidewall of the first cover hole CH1 may be disposed in parallel to a sidewall SP10 of the first sensor device SED1. A minimum distance d1 between the cutting plane CP10 of the first adhesive member 710 and the sidewall SP10 of the first sensor device SED1 may be greater than a minimum distance d2 between the cutting plane CP20 of the buffer member 610 and the sidewall SP10 of the first sensor device SED1. A minimum distance d3 between the cutting plane CP30 of the second adhesive member 720 and the sidewall SP10 of the first sensor device SED1 may be greater than the minimum distance d2 between the cutting plane CP20 of the buffer member 610 and the sidewall SP10 of the first sensor device SED1. The minimum distance d1 between the cutting plane CP10 of the first adhesive member 710 and the sidewall SP10 of the first sensor device SED1 may be the same as the minimum distance d3 between the cutting plane CP30 of the second adhesive member 720 and the sidewall SP10 of the first sensor device SED1.

Also, the minimum distance d1 between the first adhesive member 710 and the first sensor device SED1 may differ from the minimum distance d3 between the second adhesive member 720 and the first sensor device SED1.

Referring to FIG. 15, the minimum distance d1 between the cutting plane CP10 of the first adhesive member 710 and the sidewall SP10 of the first sensor device SED1 and the minimum distance d3 between the cutting plane CP30 of the second adhesive member 720 and the sidewall SP10 of the first sensor device SED1 may both be greater than the minimum distance d2 between the cutting plane CP20 of the buffer member 610 and the sidewall SP10 of the first sensor device SED1.

In this case, the minimum distance d1 between the cutting plane CP10 of the first adhesive member 710 and the sidewall SP10 of the first sensor device SED1 may be smaller than the minimum distance d3 between the cutting plane CP30 of the second adhesive member 720 and the sidewall SP10 of the first sensor device SED1. That is, the minimum distance d3 between the cutting plane CP30 of the second adhesive member 720 and the sidewall SP10 of the first sensor device SED1 may be greater than the minimum distance d1 between the cutting plane CP10 of the first adhesive member 710 and the sidewall SP10 of the first sensor device SED1.

Referring to FIG. 16, the minimum distance d1 between the cutting plane CP10 of the first adhesive member 710 and the sidewall SP10 of the first sensor device SED1 may be greater than the minimum distance d3 between the cutting plane CP30 of the second adhesive member 720 and the sidewall SP10 of the first sensor device SED1. That is, the minimum distance d3 between the cutting plane CP30 of the second adhesive member 720 and the sidewall SP10 of the first sensor device SED1 may be smaller than the minimum distance d1 between the cutting plane CP10 of the first adhesive member 710 and the sidewall SP10 of the first sensor device SED.

Referring to FIGS. 17 and 18, the first adhesive member 710, the second adhesive member 720, and the buffer member 610 are prepared. Thereafter, first, second, and third through holes PPH1, PPH2, and PPH3 are defined in the first adhesive member 710, the buffer member 610, and the second adhesive member 720, respectively, through laser cutting.

The diameter of the first through hole PPH1 of the first adhesive member 710 may be greater than the diameter of the second through hole PPH2 of the buffer member 610. The diameter of the third through hole PPH3 of the second adhesive member 720 may be greater than the diameter of the second through hole PPH2 of the buffer member 610. The diameter of the first through hole PPH1 of the first adhesive member 710 may be greater than, smaller than, or equal to, the diameter of the third through hole PPH3 of the second adhesive member 720.

Thereafter, referring to FIG. 18, the first adhesive member 710, the buffer member 610, and the second adhesive member 720 are aligned so that the first, second, and third through holes PPH1, PPH2, and PPH3 overlap with one another and together define one through hole PPH. Thereafter, the first adhesive member 710, the buffer member 610, and the second adhesive member 720 are bonded together, thereby fabricating the panel lower cover 600.

Referring to FIGS. 19 and 20, in the first cover hole CH1, the first adhesive member 710 and the buffer member 610 may be spaced apart from each other by a predetermined distance, and the second adhesive member 720 and the buffer member 610 may be spaced apart from each other by a predetermined distance in a plan view.

Specifically, in an embodiment, a distance dd1 between the cutting plane CP10 of the first adhesive member 710 and the cutting plane CP20 of the buffer member 610 may be about 0.01 mm to about 0.15 mm, for example. In an embodiment, a distance dd2 between the cutting plane CP30 of the second adhesive member 720 and the cutting plane CP20 of the buffer member 610 may be about 0.01 mm to about 0.15 mm, for example. In an embodiment, when the distance dd1 between the cutting plane CP10 of the first adhesive member 710 and the cutting plane CP20 of the buffer member 610 is 0.01 mm or greater, burrs on the cutting plane CP10 of the first adhesive member 710 may be prevented from protruding outwardly beyond the cutting plane CP20 of the buffer member 610, for example. When the distance dd1 between the cutting plane CP10 of the first adhesive member 710 and the cutting plane CP20 of the buffer member 610 is 0.15 mm, the bonding of the panel lower cover 600 by the first adhesive member 710 may be prevented from being lowered.

As already mentioned above, a minimum distance d1 between the cutting plane CP10 of the first adhesive member 710 and the sidewall SP10 of the first sensor device SED1 and a minimum distance d3 between the cutting plane CP30 of the second adhesive member 720 and the sidewall SP10 of the first sensor device SED1 may be greater than a minimum distance d2 between the cutting plane CP20 of the buffer member 610 and the sidewall SP10 of the first sensor device SED1. In this case, as illustrated in FIG. 21, burrs BU on the cutting plane CP10 of the first adhesive member 710 and/or on the cutting plane CP30 of the second adhesive member 720 may be prevented from protruding outwardly beyond the cutting plane CP20 of the buffer member 610.

Even in a case where the minimum distance d1 between the first adhesive member 710 and the first sensor device SED1 differs from the minimum distance d3 between the second adhesive member 720 and the first sensor device SED1, the burrs BU on the cutting plane CP10 of the first adhesive member 710 and/or on the cutting plane CP30 of the second adhesive member 720 may be prevented from protruding outwardly beyond the cutting plane CP20 of the buffer member 610 because the minimum distance d1 between the first adhesive member 710 and the first sensor device SED1 and the minimum distance d3 between the second adhesive member 720 and the first sensor device SED1 are both greater than the minimum distance d2 between the buffer member 610 and the first sensor device SED1. Accordingly, recognition error in the first sensor device SED1 may be prevented, and interference between the first sensor device SED1 and burrs may also be prevented.

Figure 22:
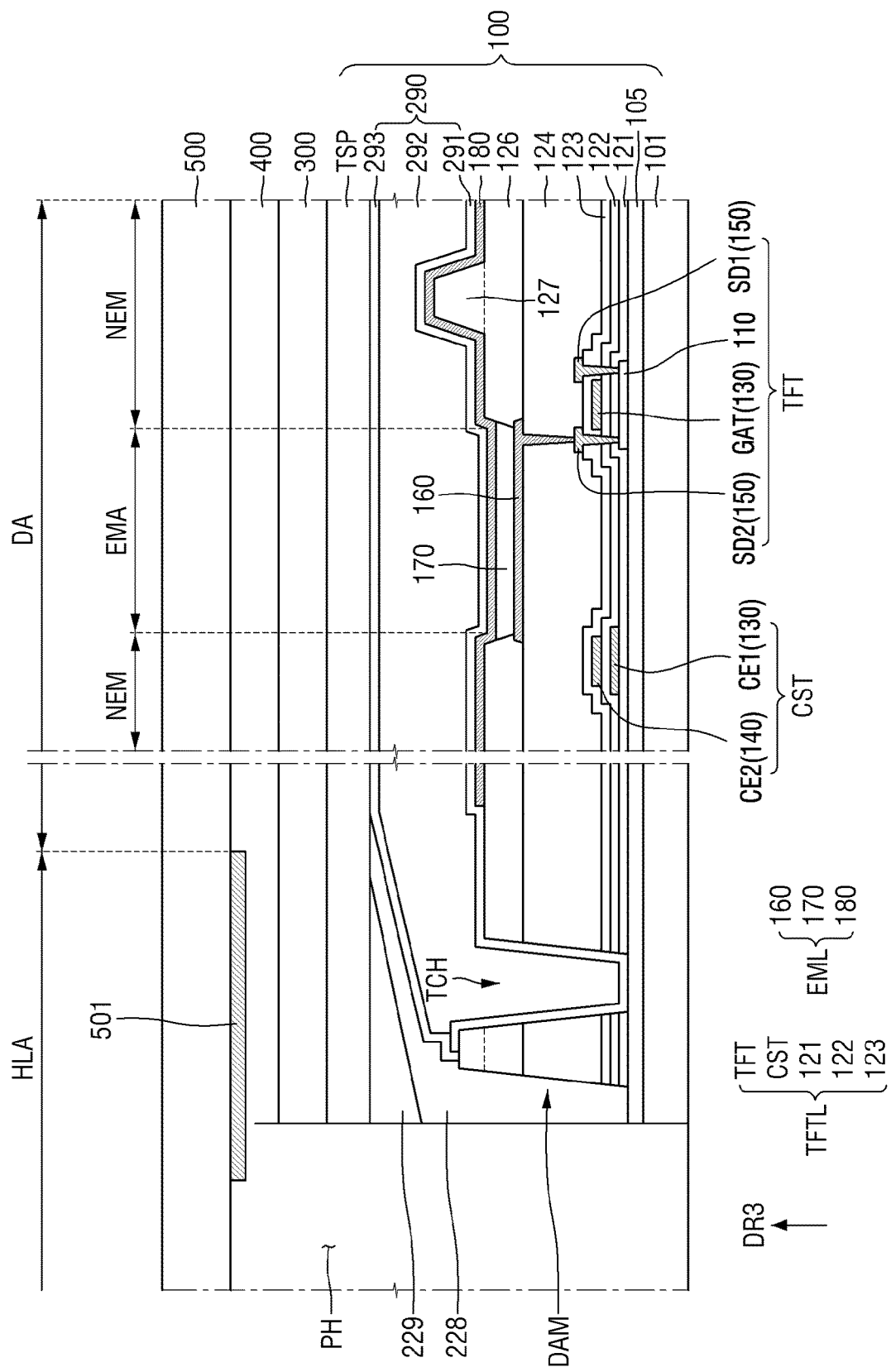
FIG. 22 is a cross-sectional view of an embodiment of a display device according to the invention.

FIG. 22 is a cross-sectional view of an embodiment of a display device according to the invention.

Specifically, FIG. 22 illustrates a display area DA and a panel hole PH of a display device 10. For convenience, a protective layer 200, a panel lower cover 600, and a fourth adhesive member 740 are not illustrated in FIG. 22.

Referring to FIG. 22, a display panel 100 may include a substrate 101, a buffer layer 105, which is disposed on the substrate 101, a thin-film transistor ("TFT") layer TFTL, which is disposed on the buffer layer 105, a light-emitting element layer EML, which is disposed on the TFT layer TFTL, and an encapsulation layer 290, which is disposed on the light-emitting element layer EML.

In an embodiment, the substrate 101 may include a polymer resin such as PI to be foldable, for example, but the invention is not limited thereto.

The buffer layer 105 is disposed on the substrate 101. The buffer layer 105 may be disposed on a surface of the substrate SUB, which is susceptible to moisture, to protect the TFT layer TFTL and the light-emitting element layer EML from moisture infiltrated through the substrate SUB. The buffer layer 105 may include a plurality of inorganic layers that are alternately stacked. In an embodiment, the buffer layer 105 may be provided as a multilayer layer in which at least one inorganic layer selected from among a silicon nitride layer, a silicon oxynitride layer, a silicon oxide layer, a titanium oxide layer, and an aluminum oxide layer is alternately stacked. In another embodiment, the buffer layer 105 may not be provided.

The TFT layer TFTL, which includes a TFT and a capacitor CST, may be disposed on the buffer layer 105. The TFT layer TFTL may include a semiconductor layer 110, a first insulating layer 121, a second insulating layer 122, a third insulating layer 123, a first gate conductive layer 130, and a second gate conductive layer 140.

FIG. 22 illustrates the TFT as being a top-gate TFT in which a gate electrode GAT is disposed above a semiconductor layer 110, but the invention is not limited thereto. In an alternative embodiment, the TFT may be provided as a bottom-gate TFT in which the gate electrode GAT is disposed below the semiconductor layer 110 or a double-gate TFT in which the gate electrode GAT is disposed both above and below the semiconductor layer 110.

The semiconductor layer 110 of the TFT may be disposed on the buffer layer 105. In an embodiment, the semiconductor layer 110 may include polycrystalline silicon, monocrystalline silicon, low-temperature polycrystalline silicon, amorphous silicon, or an oxide semiconductor, for example. A light-blocking layer may be disposed between the buffer layer 105 and the semiconductor layer 110 to block external light incident upon the semiconductor layer 110.

A first insulating layer 121 may be disposed on the semiconductor layer 110. In an embodiment, the first insulating layer 121 may be provided as an inorganic layer such as a silicon nitride layer, a silicon oxynitride layer, a silicon oxide layer, a titanium oxide layer, or an aluminum oxide layer.

The first gate conductive layer 130, which includes the gate electrode GAT and a first electrode CE2 of the capacitor CST, may be disposed on the first insulating layer 121. The gate electrode GAT may overlap with the semiconductor layer 110 in a third direction DR3. In an embodiment, the first gate conductive layer 130 may be provided as a single- or multilayer layer including molybdenum (Mo), aluminum (Al), chromium (Cr), gold (Au), titanium (Ti), nickel (Ni), neodymium (Nd), copper (Cu), or an alloy thereof.

The second insulating layer 122 may be disposed on the first gate conductive layer 130. In an embodiment, the second insulating layer 122 may be provided as an inorganic layer such as a silicon nitride layer, a silicon oxynitride layer, a silicon oxide layer, a titanium oxide layer, or an aluminum oxide layer.

The second gate conductive layer 140, which includes a second electrode CE2 of the capacitor CST, may be disposed on the second insulating layer 122. The second electrode CE2 of the capacitor CST may overlap with the first electrode CE1 of the capacitor CST in the third direction DR3. In an embodiment, the second gate conductive layer 140 may be provided as a single- or multilayer layer including Mo, Al, Cr, Au, Ti, Ni, Nd, Cu, or an alloy thereof.

The third insulating layer 123 may be disposed on the second gate conductive layer 140. In an embodiment, the third insulating layer 123 may be provided as an inorganic layer such as a silicon nitride layer, a silicon oxynitride layer, a silicon oxide layer, a titanium oxide layer, or an aluminum oxide layer.

A data conductive layer 150, which includes first and second electrodes SD1 and SD2 of the TFT may be disposed on the third insulating layer 123. The first and second electrodes SD1 and SD2 of the TFT may be connected to the semiconductor layer 110 via contact holes that penetrate the third insulating layer 123, the second insulating layer 122, and the first insulating layer 121.

A fourth insulating layer 124 may be disposed on the data conductive layer 150. The fourth insulating layer 124 may be a planarization layer that planarizes a height difference provided by the TFT. In an embodiment, the fourth insulating layer 124 may be provided as an organic layer including an acrylic resin, an epoxy resin, a phenolic resin, a polyamide resin, or a PI resin, for example.

The light-emitting element layer EML is disposed on the TFT layer TFTL. The light-emitting element layer EML may include an anode electrode 160, a light-emitting layer 170, and a cathode electrode 180.

The anode electrode 160 is disposed on the fourth insulating layer 124. The anode electrode 160 may be connected to the second electrode SD2 of the TFT via a contact hole that penetrates the fourth insulating layer 124. The anode electrode 160 may at least partially overlap with an emission area EMA.

In a top emission structure in which light is emitted toward the cathode electrode 180 from the light-emitting layer 170, the anode electrode 160 may be provided as a single layer including Mo, Ti, Cu, or Al or may include a metallic material with high reflectance such as a stack of Al and Ti (e.g., Ti/Al/Ti), or a stack of Al and indium tin oxide ("ITO") (e.g., ITO/Al/ITO), a silver (Ag)-palladium (Pd)-copper (Cu) ("APC") alloy, or a stack of an APC alloy and ITO (e.g., ITO/APC/ITO).

In a bottom emission structure in which light is emitted toward the anode electrode 160 from the light-emitting layer 170, the anode electrode 160 may include a transparent conductive oxide ("TCO") material capable of transmitting light therethrough, such as ITO or indium zinc oxide ("IZO"), or a semitransparent metallic material such as magnesium (Mg), Ag, or an alloy thereof. In a case where the anode electrode 160 includes a semitransparent metallic material, emission efficiency may be improved due to micro-cavities.

A bank 126 may be disposed on the anode electrode 160. An opening that exposes the anode electrode 160 may be defined in the bank 126. Thus, the emission area EMA and a non-emission area NEM may be defined by the bank 126.

A spacer 127 may be disposed on the bank 126. The spacer 127 may maintain the gap between the bank 126 and an element disposed above the spacer 127.

The light-emitting layer 170 is disposed on the anode electrode 160, exposed by the bank 126. The light-emitting layer 170 may include an organic material layer. The organic material layer of the light-emitting layer 170 may include an organic light-emitting layer and may further include a hole injection/transport layer and/or an electron injection/transport layer.

The cathode electrode 180 may be disposed on the light-emitting layer 170. The cathode electrode 180 may be provided in common for all pixels.

In the top emission structure, the cathode electrode 180 may include a TCO material capable of transmitting light therethrough, such as ITO or IZO, or a semitransparent metallic material such as Mg, Ag, or an alloy thereof. In a case where the cathode electrode 180 includes a semitransparent metallic material, emission efficiency may be improved due to micro-cavities.

In the bottom emission structure, the cathode electrode 180 may be provided as a single layer including Mo, Ti, Cu, or Al or may include a metallic material with high reflectance such as a stack of Al and Ti (e.g., Ti/Al/Ti), or a stack of Al and ITO (e.g., ITO/Al/ITO), an APC alloy, or a stack of an APC alloy and ITO (e.g., ITO/APC/ITO).

An encapsulation layer 290, which includes a first inorganic layer 291, a first organic layer 292, and a second inorganic layer 293, is disposed on the cathode electrode 180. The first organic layer 292 may be sealed by the first and second inorganic layers 291 and 293.

The first and second inorganic layers 291 and 293 may be provided as silicon nitride layers, silicon oxynitride layers, silicon oxide layers, titanium oxide layers, or aluminum oxide layers, but the invention is not limited thereto. In an embodiment, the first organic layer 292 may include an acrylic resin, an epoxy resin, a phenolic resin, a polyamide resin, or a PI resin, for example, but the invention is not limited thereto.

The display panel 100 may further include a touch layer TSP, which is disposed on the encapsulation layer 290. The touch layer TSP may include sensor electrodes for sensing touch input. In an alternative embodiment, the touch layer TSP may be provided as a separate panel or film and may be attached on the display panel 100.

A polarizer layer 300 may be disposed on the touch layer TSP of the display panel 100. A shock-absorbing layer 400 may be disposed on the polarizer layer 300, and a window member 500 may be disposed on the shock-absorbing layer 400.

A dam structure DAM may be disposed around the panel hole PH. The dam structure DAM may include insulating layers 105, 121, 122, 123, 124, 126, and 127 that are stacked. A groove TCH, which is defined by removing the insulating layers 105, 121, 122, 123, 124, 126, and 127 and metal layers 130, 140, 150, 160, and 180, may be disposed between the dam structure DAM and the emission area EMA. At least a portion of the encapsulation layer 290 may be disposed in the groove TCH. In an embodiment, the first organic layer 292 of the encapsulation layer 290 may reach the dam structure DAM, but not in a hole area HLA between the dam structure DAM and the panel hole PH, for example. That is, the first organic layer 292 may be prevented from spilling over the dam structure DAM into the hole area HLA. FIG. 22 illustrates that the first and second inorganic layers 291 and 293 of the encapsulation layer 290 are terminated above the dam structure DAM, but the invention is not limited thereto. In an alternative embodiment, the first and second inorganic layers 291 and 293 of the encapsulation layer 290 may be disposed in the hole area HLA between the dam structure DAM and the panel hole PH.

The hole area HLA may overlap with the dam structure DAM in the third direction DR3, but not with the emission area EMA. Thus, no image may be displayed in the hole area HLA. A light-blocking pattern 501 may be disposed in the hole area HLA. The light-blocking pattern 501 may overlap with the dam structure DAM in the third direction DR3. The light-blocking pattern 501 may overlap with the edge of the panel hole PH in the third direction DR3 in the third direction DR3.

At least one organic layer, i.e., second and third organic layers 228 and 229, may be further disposed on the encapsulation layer 290 to planarize the space between the dam structure DAM and the panel hole PH in the hole area HLA. In an embodiment, the second organic layer 228 may be disposed on the second inorganic layer 293, and the third organic layer 229 may be disposed on the second organic layer 228, for example. The second and third organic layers 228 and 229 may planarize the space between the dam structure DAM and the panel hole PH in the hole area HLA.

Figure 23:
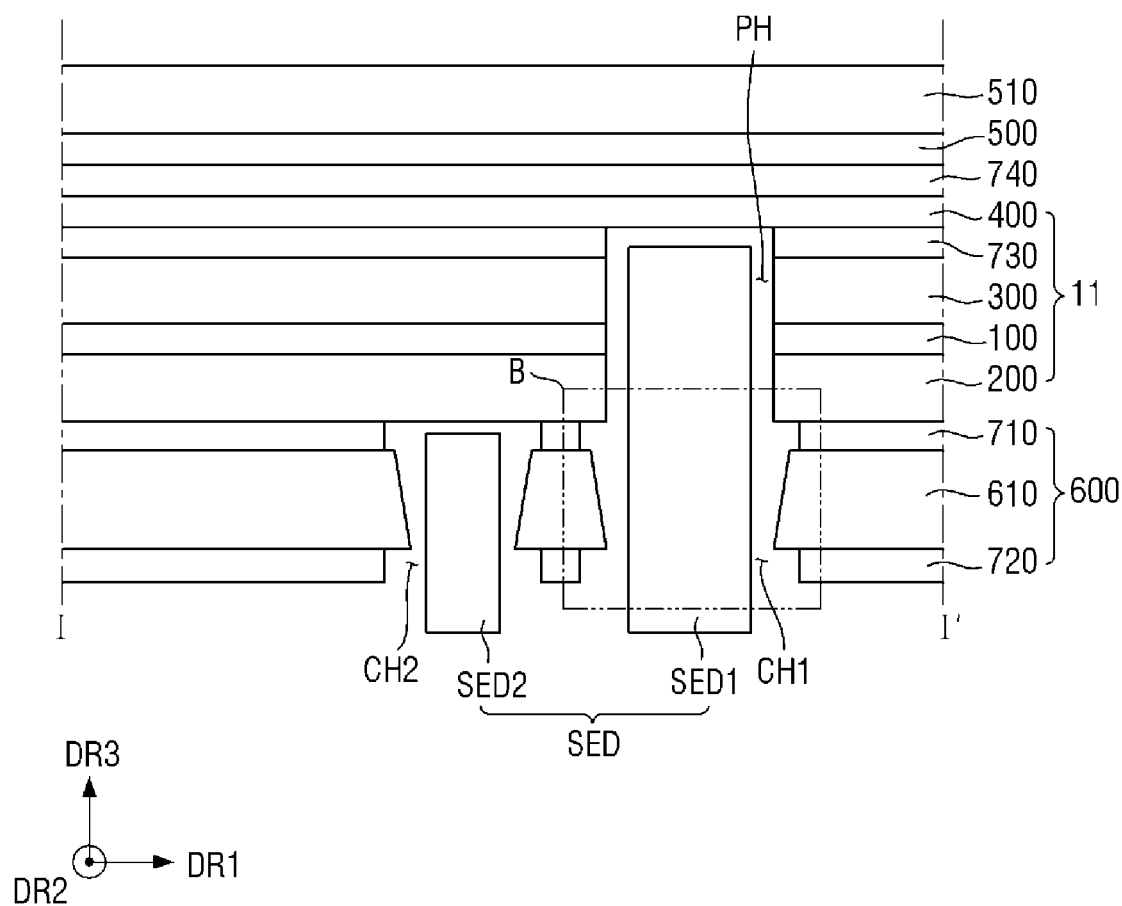
FIG. 23 is a cross-sectional view illustrating another embodiment of first and second cover holes of a display device according to the invention.
Figure 24:
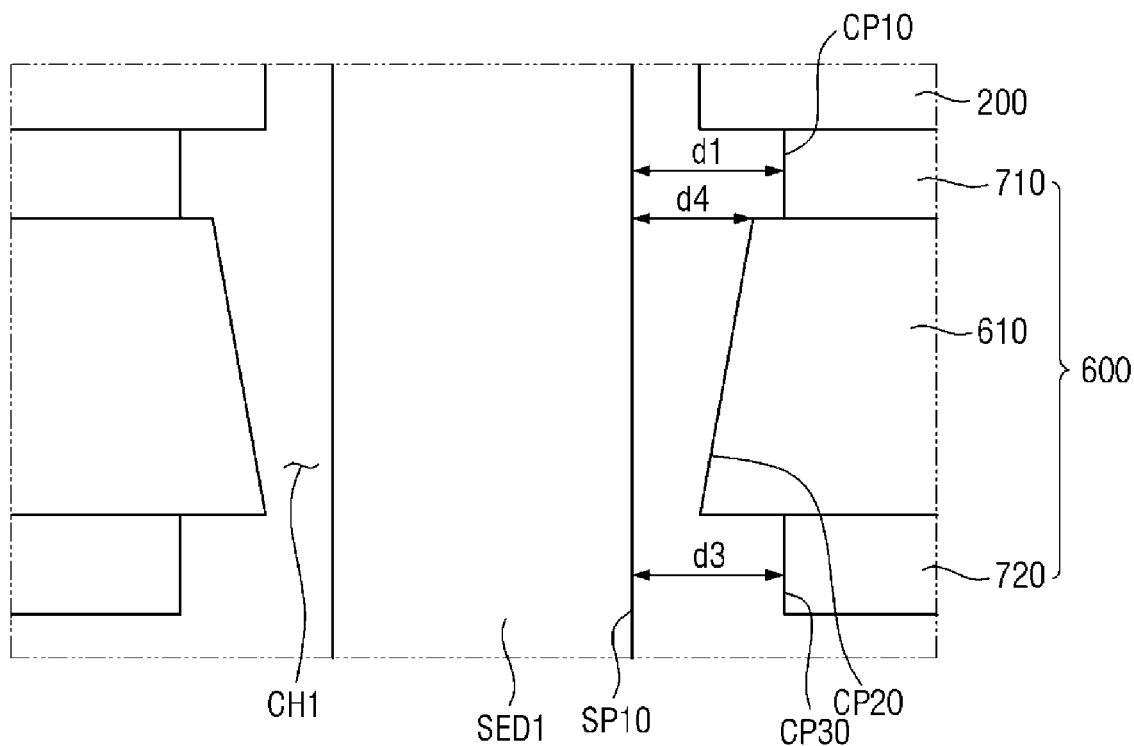
FIG. 24 is an enlarged cross-sectional view illustrating an area B of FIG. 23.

FIG. 23 is a cross-sectional view illustrating another embodiment of first and second cover holes of a display device according to the invention. FIG. 24 is an enlarged cross-sectional view illustrating an area B of FIG. 23.

The embodiment of FIGS. 23 and 24 differs from the embodiment of FIGS. 13 and 14 in that the distance between a buffer member 610 of a panel lower cover 600 and a first sensor device SED1 increases as a distance to a display module 11 is smaller.

Referring to FIGS. 23 and 24, the distance between the buffer member 610 of the panel lower cover 600 and the first sensor device SED1 may gradually increase as a distance to the display module 11 is smaller. In other words, the diameter of a first cover hole CH1 in the panel lower cover 600 may gradually increase as a distance to the display module 11 is smaller.

The buffer member 610 may have an inclined cutting plane CP20 depending on how it is cut by laser cutting. In an embodiment, as illustrated in FIGS. 23 and 24, in a case where laser cutting is performed at a surface of the buffer member 610, i.e., the top surface of the buffer member 610 adjacent to the display module 11, the distance between the buffer member 610 of the panel lower cover 600 and the first sensor device SED1 may gradually increase as a distance to the display module 11 is smaller, for example.

A cutting plane CP10 of a first adhesive member 710 and a cutting plane CP30 of a second adhesive member 720 may be disposed in parallel to a sidewall SP10 of the first sensor device SED1. The cutting plane CP20 of the buffer member 610 may face, but not be in parallel to, the sidewall SP10 of the first sensor device SED1.

A minimum distance d1 between the first adhesive member 710 of the panel lower cover 600 and the first sensor device SED1 may be greater than a maximum distance d4 between the buffer member 610 and the first sensor device SED1. A minimum distance d3 between the second adhesive member 720 of the panel lower cover 600 and the first sensor device SED1 may be greater than the maximum distance d4 between the buffer member 610 and the first sensor device SED1. The minimum distance d1 between the first adhesive member 710 and the first sensor device SED1 may be the same as, or different from, the minimum distance d3 between the second adhesive member 720 and the first sensor device SED1.

Specifically, the distance between the cutting plane CP20 of the buffer member 610 and the first sensor device SED1 may gradually increase as a distance to the display module 11 is smaller. The minimum distance d1 between the first adhesive member 710 and the first sensor device SED1 may be greater than the maximum distance d4 between the buffer member 610 and the first sensor device SED1. Also, the minimum distance d3 between the second adhesive member 720 and the first sensor device SED1 may be greater than the maximum distance d4 between the buffer member 610 and the first sensor device SED1.

Also, the minimum distance d1 between the first adhesive member 710 and the first sensor device SED1 may be the same as, or different from, the minimum distance d3 between the second adhesive member 720 and the first sensor device SED1. In an embodiment, the minimum distance d1 between the first adhesive member 710 and the first sensor device SED1 may be greater than the minimum distance d3 between the second adhesive member 720 and the first sensor device SED1, for example. In another example, the minimum distance d1 between the first adhesive member 710 and the first sensor device SED1 may be smaller than the minimum distance d3 between the second adhesive member 720 and the first sensor device SED1.

As described above, the distance between the buffer member 610 and the first sensor device SED1 may gradually increase as a distance to the display module 11 is smaller. In this case, burrs BU on the cutting plane CP10 of the first adhesive member 710 and/or on the cutting plane CP30 of the second adhesive member 720 may be prevented from protruding outwardly beyond the cutting plane CP20 of the buffer member 610.

Even in a case where the minimum distance d1 between the first adhesive member 710 and the first sensor device SED1 differs from the minimum distance d3 between the second adhesive member 720 and the first sensor device SED1, the burrs BU on the cutting plane CP10 of the first adhesive member 710 and/or on the cutting plane CP30 of the second adhesive member 720 may be prevented from protruding outwardly beyond the cutting plane CP20 of the buffer member 610 because the minimum distance d1 between the first adhesive member 710 and the first sensor device SED1 and the minimum distance d2 between the second adhesive member 720 and the first sensor device SED1 are both greater than the maximum distance d4 between the buffer member 610 and the first sensor device SED1.

Figure 25:
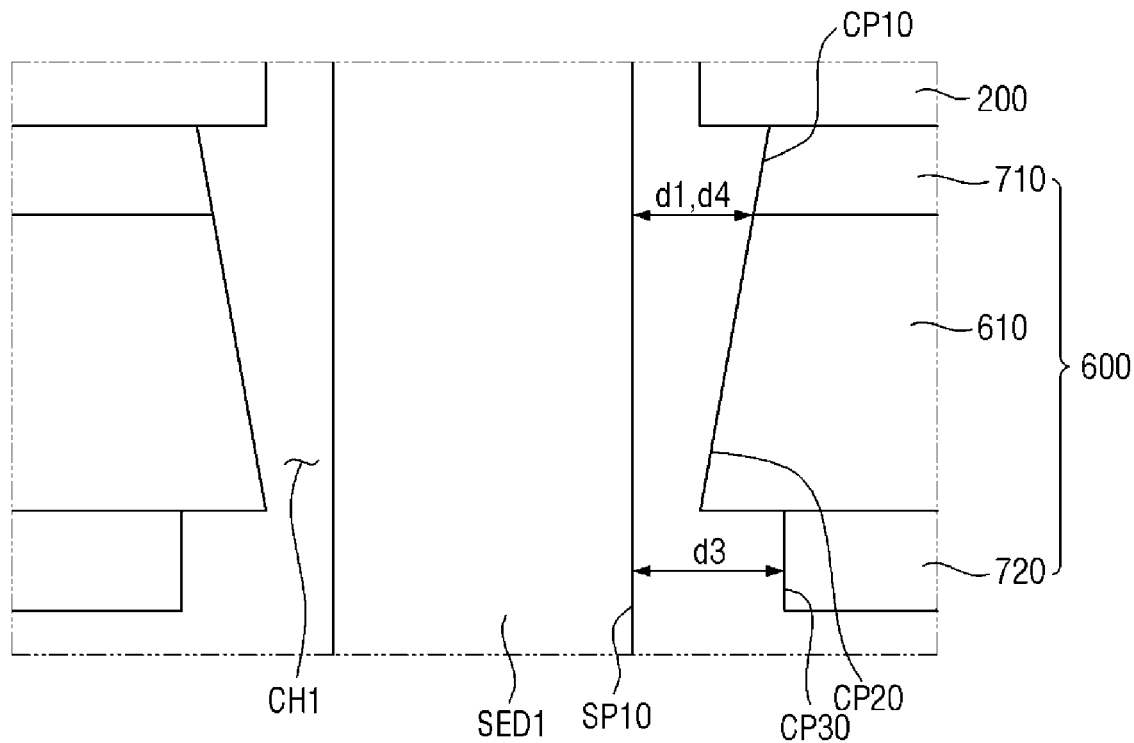
FIG. 25 is an enlarged cross-sectional view illustrating another embodiment of a first cover hole of a display device according to the invention.

FIG. 25 is an enlarged cross-sectional view illustrating another embodiment of a first cover hole of a display device according to the invention.

The embodiment of FIG. 25 differs from the embodiment of FIGS. 23 and 24 in that the distance between a first adhesive member 710 and a first sensor device SED1 increases as a distance to a display module 11 is smaller.

Referring to FIG. 25, the distance between a buffer member 610 of a panel lower cover 600 and the first sensor device SED1 may gradually increase as a distance to the display module 11 is smaller. The distance between the first adhesive member 710, which is disposed on the buffer member 610, and the first sensor device SED1 may gradually increase as a distance to the display module 11 is smaller.

A cutting plane CP10 of the first adhesive member 710 may be inclined depending on the direction in which the first adhesive member 710 is cut by laser cutting. In an embodiment, as illustrated in FIG. 25, in a case where laser cutting is performed at a surface of the buffer member 610, i.e., the top surface of the buffer member 610 adjacent to the display module 11, the distance between the buffer member 610 of the panel lower cover 600 and the first sensor device SED1 may gradually increase as a distance to the display module 11 is smaller, for example. The inclination angle of the cutting plane CP10 of the first adhesive member 710 may be the same as the inclination angle of the cutting plane CP20 of the buffer member 610, but the invention is not limited thereto. In an alternative embodiment, the inclination angle of the cutting plane CP10 of the first adhesive member 710 may be greater than, or smaller than, the inclination angle of the cutting plane CP20 of the buffer member 610.

The cutting plane CP10 of the first adhesive member 710 and the cutting plane CP20 of the buffer member 610 may face, but not be in parallel to, a sidewall SP10 of the first sensor device SED1. The cutting plane CP30 of the second adhesive member 720 may face, and be parallel to, the sidewall SP10 of the first sensor device SED1. The cutting plane CP10 of the first adhesive member 710 and the cutting plane CP20 of the buffer member 610 may be in contact with, and be aligned with, each other, but the invention is not limited thereto. In an embodiment, the cutting plane CP10 of the first adhesive member 710 may be spaced apart from the cutting plane CP20 of the buffer member 610.

A minimum distance d1 between the first adhesive member 710 of the panel lower cover 600 and the first sensor device SED1 may be the same as a maximum distance d4 between the buffer member 610 and the first sensor device SED1. A minimum distance d3 between the second adhesive member 720 and the first sensor device SED1 may be greater than the maximum distance d4 between the buffer member 610 and the first sensor device SED1. Thus, even when burrs are provided on the cutting plane CP10 of the first adhesive member 710 and/or on the cutting plane CP30 of the second adhesive member 720, the burrs may be prevented from protruding outwardly beyond the cutting plane CP20 of the buffer member 610.

Specifically, the distance between the cutting plane CP10 of the first adhesive member 710 and the sidewall SP10 of the first sensor device SED1 may gradually increase as a distance to the display module 11 is smaller. A minimum distance d1 between the cutting plane CP10 of the first adhesive member 710 and the sidewall SP10 of the first sensor device SED1 may be the same as a maximum distance d4 between the cutting plane CP20 of the buffer member 610 and the sidewall SP10 of the first sensor device SED1. A minimum distance d3 between the cutting plane CP30 of the second adhesive member 720 and the sidewall SP10 of the first sensor device SED1 may be greater than a maximum distance d4 between the cutting plane CP20 of the buffer member 610 and the sidewall SP10 of the first sensor device SED1.

The minimum distance d1 between the cutting plane CP10 of the first adhesive member 710 and the sidewall SP10 of the first sensor device SED1 may be the same as, or different from, the minimum distance d3 between the cutting plane CP30 of the second adhesive member 720 and the sidewall SP10 of the first sensor device SED1. In an embodiment, the minimum distance d1 between the cutting plane CP10 of the first adhesive member 710 and the sidewall SP10 of the first sensor device SED1 may be greater than the minimum distance d3 between the cutting plane CP30 of the second adhesive member 720 and the sidewall SP10 of the first sensor device SED1, for example. In another example, the minimum distance d1 between the cutting plane CP10 of the first adhesive member 710 and the sidewall SP10 of the first sensor device SED1 may be smaller than the minimum distance d3 between the cutting plane CP30 of the second adhesive member 720 and the sidewall SP10 of the first sensor device SED1.

As already mentioned above, the distance between the buffer member 610 and the first sensor device SED1 may gradually increase as a distance to the display module 11 is smaller. In this case, the distance between the first adhesive member 710 and the first sensor device SED1 may also gradually increase as a distance to the display module 11 is smaller. Accordingly, even when burrs BU are provided on the cutting plane CP10 of the first adhesive member 710 and/or on the cutting plane CP30 of the second adhesive member 720, the burrs BU may be prevented from protruding outwardly beyond the cutting plane CP20 of the buffer member 610.

Figure 26:
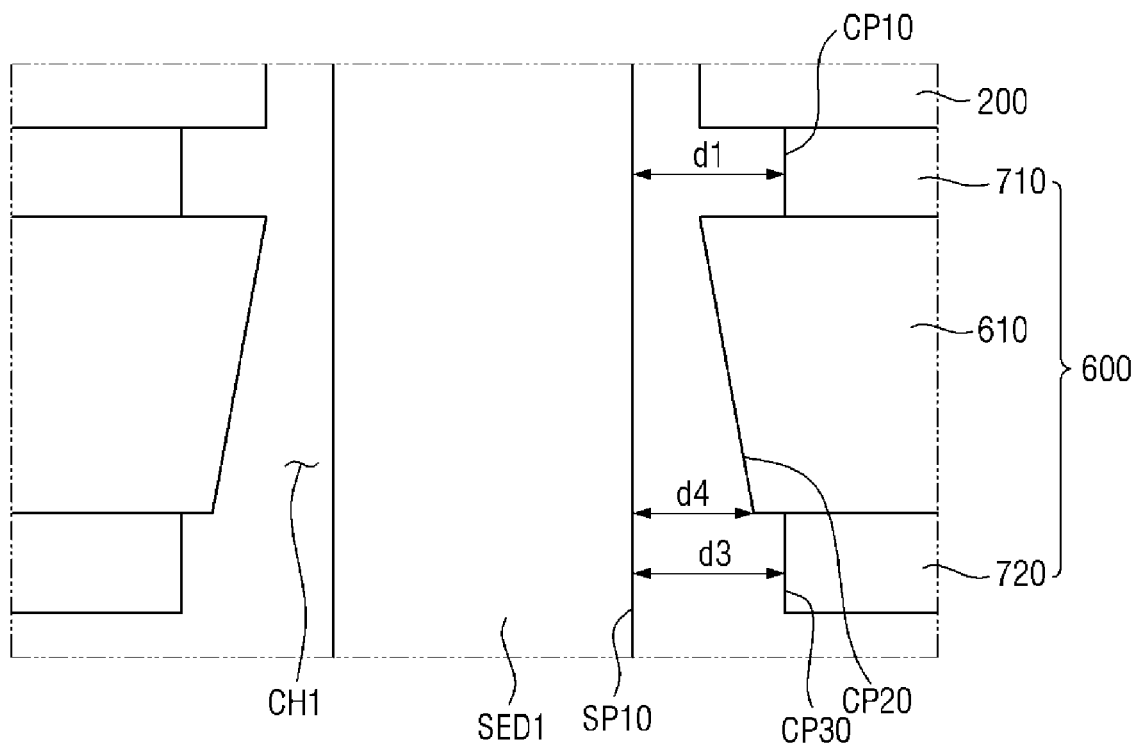
FIG. 26 is an enlarged cross-sectional view illustrating another embodiment of a first cover hole of a display device according to the invention.
Figure 27:
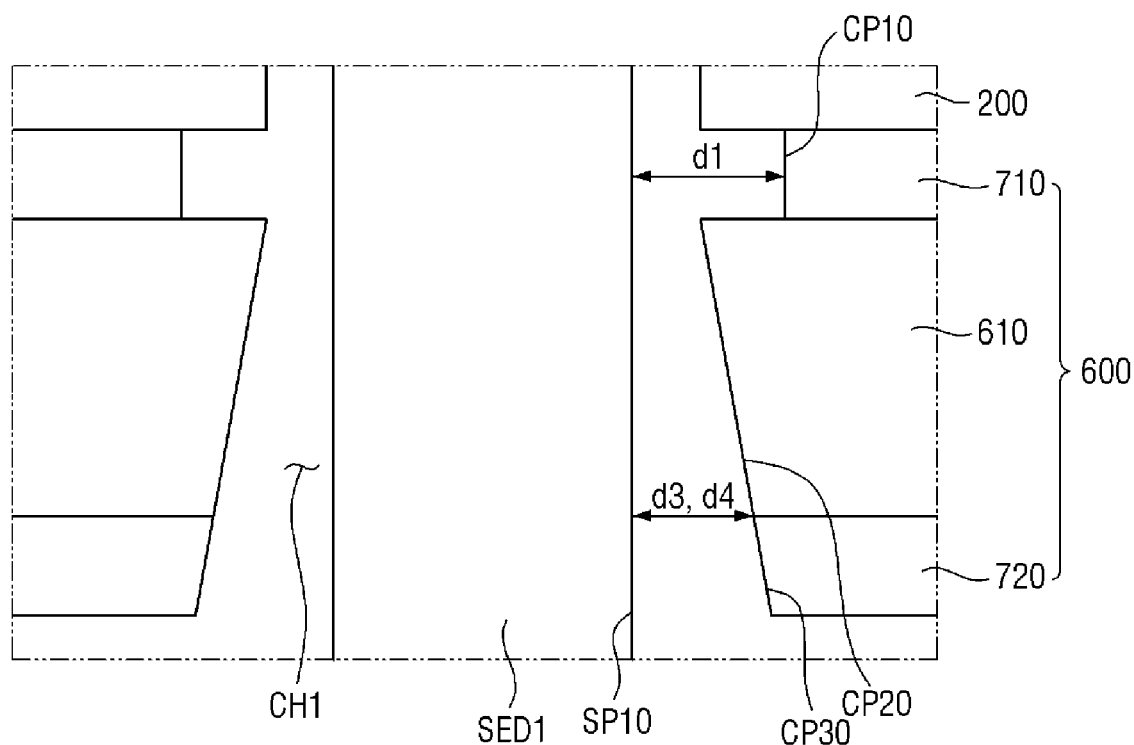
FIG. 27 is an enlarged cross-sectional view illustrating another embodiment of a first cover hole of a display device according to the invention.

FIG. 26 is an enlarged cross-sectional view illustrating another embodiment of a first cover hole of a display device according to the invention. FIG. 27 is an enlarged cross-sectional view illustrating another embodiment of a first cover hole of a display device according to the invention.

The embodiment of FIG. 26 differs from the embodiments of FIGS. 24 and 25 in that the distance between a buffer member 610 of a panel lower cover 600 and a first sensor device SED1 decreases as a distance to a display module 11 is smaller.

Referring to FIG. 26, the distance between the buffer member 610 of the panel lower cover 600 and the first sensor device SED1 may gradually decrease as a distance to the display module 11 is smaller. In other words, the diameter of a first cover hole CH1 in the panel lower cover 600 may gradually decrease as a distance to the display module 11 is smaller.

A cutting plane CP20 of the buffer member 610 may be inclined depending on the direction in which the buffer member 610 is cut by laser cutting. In an embodiment, as illustrated in FIG. 26, in a case where laser cutting is performed at a surface of the buffer member 610, i.e., the bottom surface of the buffer member 610 that is opposite to the surface of the buffer member 610 that is adjacent to the display module 11, the distance between the buffer member 610 of the panel lower cover 600 and the first sensor device SED1 may gradually decrease as a distance to the display module 11 is smaller, for example.

A cutting plane CP10 of a first adhesive member 710 and a cutting plane CP30 of a second adhesive member 720 may be disposed in parallel to a sidewall SP10 of the first sensor device SED1. The cutting plane CP20 of the buffer member 610 may face, but not be in parallel to, the sidewall SP10 of the first sensor device SED1.

A minimum distance d1 between the first adhesive member 710 and the first sensor device SED1 may be greater than a maximum distance d4 between the buffer member 610 and the first sensor device SED1. A minimum distance d3 between the second adhesive member 720 and the first sensor device SED1 may be greater than the maximum distance d4 between the buffer member 610 and the first sensor device SED1. The minimum distance d1 between the first adhesive member 710 and the first sensor device SED1 may be the same as, or different from, the minimum distance d3 between the second adhesive member 720 and the first sensor device SED1.

Specifically, the distance between the cutting plane CP20 of the buffer member 610 and the sidewall SP10 of the first sensor device SED1 may gradually decrease as a distance to the display module 11 is smaller. A minimum distance d1 between the cutting plane CP10 of the first adhesive member 710 and the sidewall SP10 of the first sensor device SED1 may be greater than a maximum distance d4 between the cutting plane CP20 of the buffer member 610 and the sidewall SP10 of the first sensor device SED1. A minimum distance d3 between the cutting plane CP30 of the second adhesive member 720 and the sidewall SP10 of the first sensor device SED1 may be greater than the maximum distance d4 between the cutting plane CP20 of the buffer member 610 and the sidewall SP10 of the first sensor device SED1.

The minimum distance d1 between the cutting plane CP10 of the first adhesive member 710 and the sidewall SP10 of the first sensor device SED1 may be the same as, or different from, the minimum distance d3 between the cutting plane CP30 of the second adhesive member 720 and the sidewall SP10 of the first sensor device SED1.

As already mentioned above, the distance between the buffer member 610 and the first sensor device SED1 may gradually decrease as a distance to the display module 11 is smaller. In this case, even when burrs BU are provided on the cutting plane CP10 of the first adhesive member 710 and/or on the cutting plane CP30 of the second adhesive member 720, the burrs BU may be prevented from protruding outwardly beyond the cutting plane CP20 of the buffer member 610.

Even in a case where the minimum distance d1 between the first adhesive member 710 and the first sensor device SED1 differs from the minimum distance d3 between the second adhesive member 720 and the first sensor device SED1, the burrs BU on the cutting plane CP10 of the first adhesive member 710 and/or on the cutting plane CP30 of the second adhesive member 720 may be prevented from protruding outwardly beyond the cutting plane CP20 of the buffer member 610 because the minimum distance d1 between the first adhesive member 710 and the first sensor device SED1 and the minimum distance d3 between the second adhesive member 720 and the first sensor device SED1 are both greater than the maximum distance d4 between the cutting plane CP20 of the buffer member 610 and the sidewall SP10 of the first sensor device SED1.

FIG. 27 is an enlarged cross-sectional view illustrating another embodiment of a first cover hole of a display device according to the invention.

The embodiment of FIG. 27 differs from the embodiment of FIG. 26 in that the distance between a second adhesive member 720 and a first sensor device SED1 decreases as a distance to a display module 11 is smaller.

Referring to FIG. 27, the distance between a buffer member 610 of a panel lower cover 600 and the first sensor device SED1 may gradually decrease as a distance to the display module 11 is smaller. The distance between the second adhesive member 720, which is disposed below the buffer member 610, and the first sensor device SED1 may decrease as a distance to the display module 11 is smaller.

A cutting plane CP30 of the second adhesive member 720 may be inclined depending on the direction in which the second adhesive member 720 is cut by laser cutting. In an embodiment, as illustrated in FIG. 27, in a case where laser cutting is performed at a surface of the second adhesive member 720, i.e., the bottom surface of the second adhesive member 720 that is opposite to the surface of the second adhesive member 720 that is adjacent to the display module 11, the distance between the second adhesive member 720 and the first sensor device SED1 may gradually decrease as a distance to the display module 11 is smaller, for example. The inclination angle of a cutting plane CP30 of the second adhesive member 720 may be the same as the inclination angle of a cutting plane CP20 of the buffer member 610, but the invention is not limited thereto. In an alternative embodiment, the inclination angle of the cutting plane CP30 of the second adhesive member 720 may be greater than, or smaller than, the inclination angle of the cutting plane CP20 of the buffer member 610.

The cutting plane CP30 of the second adhesive member 720 and the cutting plane CP20 of the buffer member 610 may face, but not be in parallel to, a sidewall SP10 of the first sensor device SED1. A cutting plane CP10 of a first adhesive member 710 may face, and be parallel to, the sidewall SP10 of the first sensor device SED1. The cutting plane CP30 of the second adhesive member 720 and the cutting plane CP20 of the buffer member 610 may be in contact with, and be aligned with, each other, but the invention is not limited thereto. In another embodiment, the cutting plane CP30 of the second adhesive member 720 may be spaced apart from the cutting plane CP20 of the buffer member 610.

A minimum distance d3 between the second adhesive member 720 and the first sensor device SED1 may be the same as a maximum distance d4 between the buffer member 610 and the first sensor device SED1. A minimum distance d1 between the first adhesive member 710 and the first sensor device SED1 may be greater than the maximum distance d4 between the buffer member 610 and the first sensor device SED1. Thus, even when burrs are provided on the cutting plane CP10 of the first adhesive member 710 and/or on the cutting plane CP30 of the second adhesive member 720, the burrs may be prevented from protruding outwardly beyond the cutting plane CP20 of the buffer member 610.

Specifically, the distance between the cutting plane CP30 of the second adhesive member 720 and the sidewall SP10 of the first sensor device SED1 may gradually decrease as a distance to the display module 11 is smaller. The minimum distance d3 between the second adhesive member 720 and the first sensor device SED1 may be the same as the maximum distance d4 between the buffer member 610 and the first sensor device SED1. The minimum distance d1 between the first adhesive member 710 and the first sensor device SED1 may be greater than the maximum distance d4 between the buffer member 610 and the first sensor device SED1.

The minimum distance d1 between the first adhesive member 710 and the first sensor device SED1 may be the same as, or different from, the minimum distance d3 between the second adhesive member 720 and the first sensor device SED1.

Figure 28:
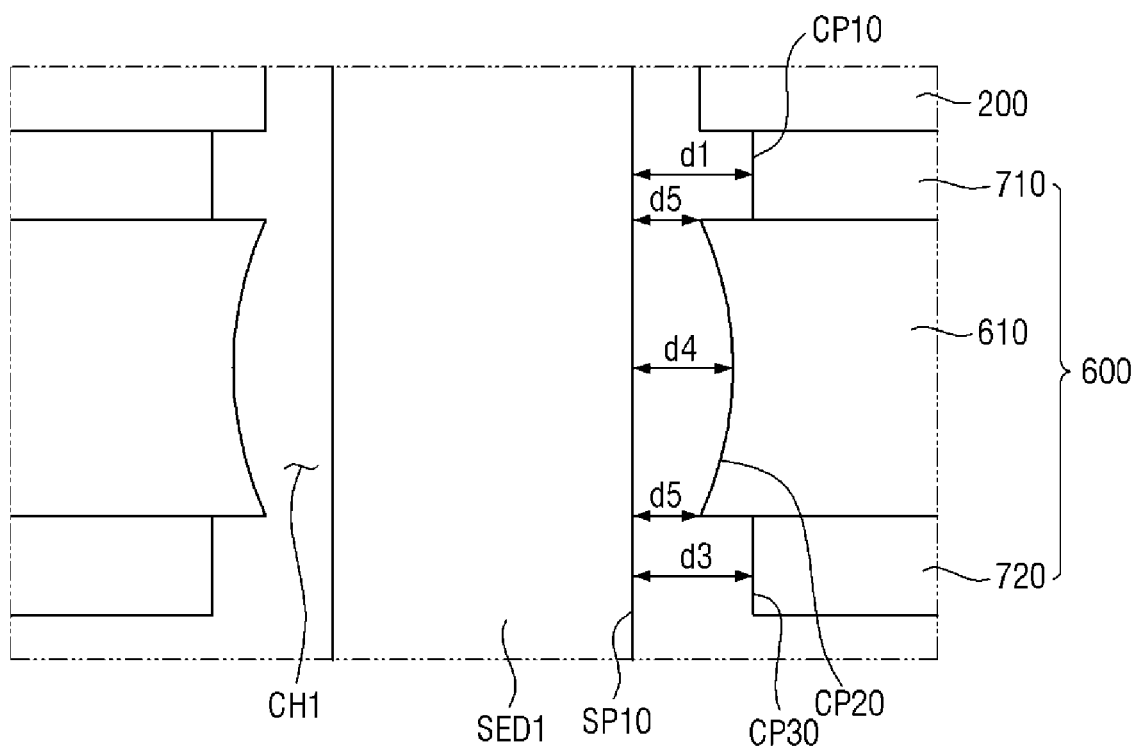
FIG. 28 is an enlarged cross-sectional view illustrating another embodiment of a first cover hole of a display device according to the invention.

FIG. 28 is an enlarged cross-sectional view illustrating another embodiment of a first cover hole of a display device according to the invention.

The embodiment of FIG. 28 differs from the embodiments of FIGS. 26 and 27 in that a cutting plane CP20 of a buffer member 610 is curved.

Referring to FIG. 28, the cutting plane CP20 of the buffer member 610 of a panel lower cover 600 may be curved. The cutting plane CP20 of the buffer member 610 may have a maximum distance d4 to a first sensor device SED1 at the center of the thickness of the buffer member 610. The cutting plane CP20 of the buffer member 610 may have a minimum distance d5 at the top or the bottom of the buffer member 610.

A first cover hole CH1 of the buffer member 610 may be defined by pressurization and laser irradiation via a laser irradiation device. The buffer member 610 may be compressed and cut by pressurization via a laser irradiation device, and as a result, the cutting plane CP20 of the buffer member 610 may be provided to be curved. In an embodiment, the cutting plane CP20 of the buffer member 610 may be concave in a direction away from the first sensor device SED1, for example. FIG. 28 illustrates that the cutting plane CP20 of the buffer member 610 has a uniform curvature, but the invention is not limited thereto. In an alternative embodiment, the cutting plane CP20 of the buffer member 610 may have a non-uniform curvature.

A cutting plane CP10 of a first adhesive member 710 and a cutting plane CP30 of a second adhesive member 720 may face, and be in parallel to, a sidewall SP10 of the first sensor device SED1. The cutting plane CP10 of the first adhesive member 710 may be spaced apart from the cutting plane CP20 of the buffer member 610, and the cutting plane CP30 of the second adhesive member 720 may be spaced apart from the cutting plane CP20 of the buffer member 610.

A minimum distance d1 between the first adhesive member 710 and the first sensor device SED1 may be greater than a minimum distance d5 between the buffer member 610 and the first sensor device SED1. A minimum distance d3 between the second adhesive member 720 and the first sensor device SED1 may be greater than the minimum distance d5 between the buffer member 610 and the first sensor device SED1. Thus, even when burrs are provided on the cutting plane CP10 of the first adhesive member 710 and/or on the cutting plane CP30 of the second adhesive member 720, the burrs may be prevented from protruding outwardly beyond the cutting plane CP20 of the buffer member 610.

Specifically, the minimum distance d1 between the first adhesive member 710 and the first sensor device SED1 may be greater than the minimum distance d5 between the buffer member 610 and the first sensor device SED1. The minimum distance d3 between the second adhesive member 720 and the first sensor device SED1 may be greater than the minimum distance d5 between the buffer member 610 and the first sensor device SED1.

The minimum distance d1 between the first adhesive member 710 and the first sensor device SED1 may be the same as, or different from, the minimum distance d3 between the second adhesive member 720 and the first sensor device SED1.

The elements between the panel lower cover 600 and the first sensor device SED1 have been described with reference to FIGS. 13 through 16 and 23 through 28, taking the first cover hole CH1 as an example, but the above descriptions thereof may be directly applicable to the second cover hole CH2.

Figure 29:
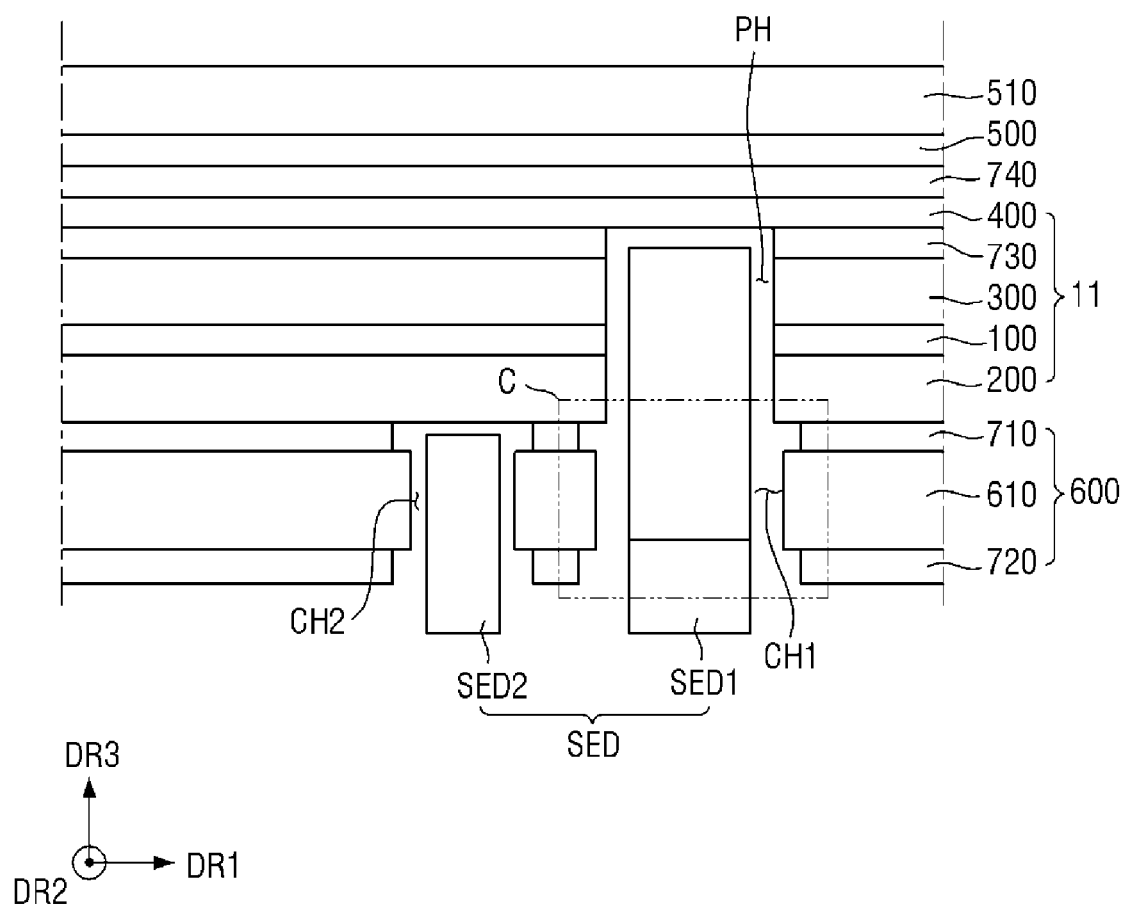
FIG. 29 is a cross-sectional view illustrating another embodiment of first and second cover holes of a display device according to the invention.
Figure 30:
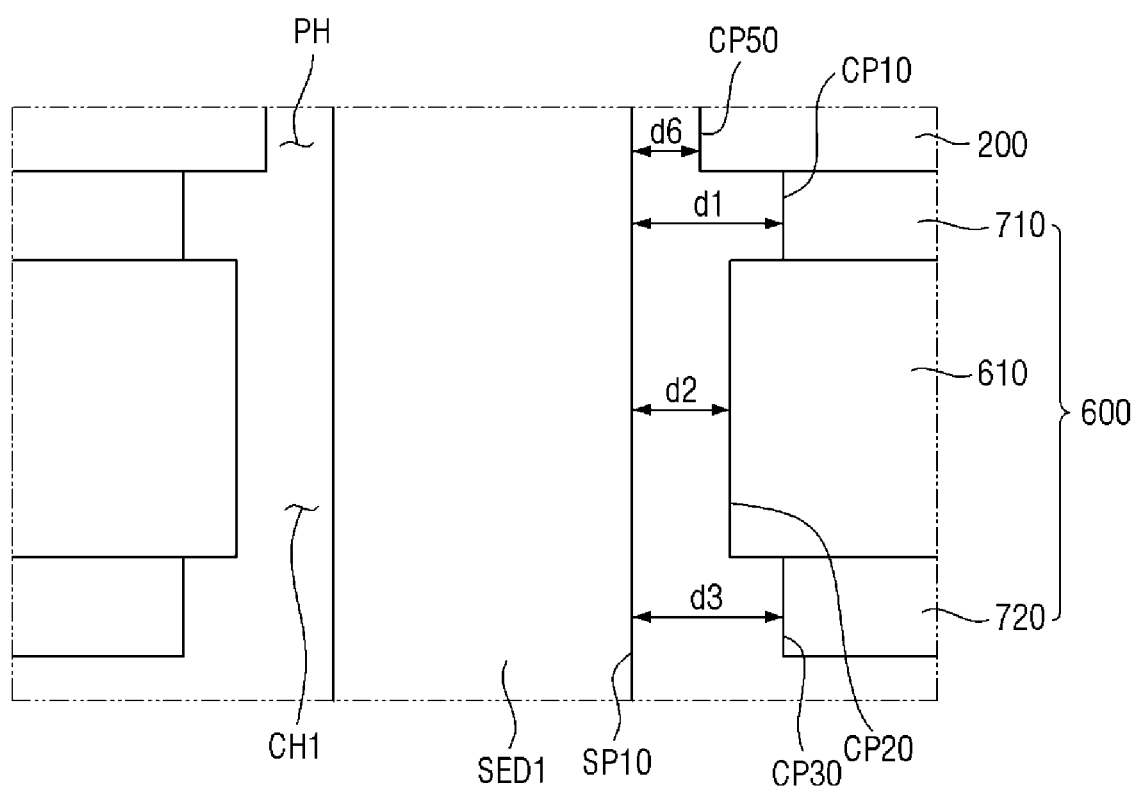
FIG. 30 is an enlarged cross-sectional view illustrating an area C of FIG. 29.

FIG. 29 is a cross-sectional view illustrating another embodiment of first and second cover holes of a display device according to the invention. FIG. 30 is an enlarged cross-sectional view illustrating an area C of FIG. 29.

The embodiment of FIGS. 29 and 30 differs from the embodiments of FIGS. 1 through 28 in that a minimum distance d6 between a protective layer 200 and a first sensor device SED1 is shorter than a minimum distance d2 between a buffer member 610 and the first sensor device SED1 and a minimum distance d3 between a second adhesive member 720 and the first sensor device SED1.

Referring to FIGS. 29 and 30, a panel lower cover 600 may be attached to a display module 11. The panel lower cover 600 may be attached to a surface of the protective layer 200 of the display module 11. A first adhesive member 710 of the panel lower cover 600 may be attached to the surface of the protective layer 200.

The protective layer 200 may be spaced apart from the first sensor device SED1 in a panel hole PH of the display module 11. The protective layer 200 may have the minimum distance d6 to the first sensor device SED1. The minimum distance d6 between the protective layer 200 and the first sensor device SED1 may be smaller than a minimum distance d1 between the first adhesive member 710 and the first sensor device SED1, a minimum distance d2 between a buffer member 610 and the first sensor device SED1, and a minimum distance d3 between the second adhesive member 720 and the first sensor device SED1.

The panel hole PH of the display module 11 and a first cover hole CH1 of the panel lower cover 600 may overlap with each other. The first cover hole CH1 may have a greater diameter than the panel hole PH to be able to be easily aligned with the panel hole PH when bonding the display module 11 and the panel lower cover 600 together.

Specifically, the minimum distance d6 between the protective layer 200 and the first sensor device SED1 may be smaller than the minimum distance d1 between the first adhesive member 710 and the first sensor device SED1. The minimum distance d6 between the protective layer 200 and the first sensor device SED1 may be smaller than the minimum distance d3 between the second adhesive member 720 and the first sensor device SED1. The minimum distance d6 between the protective layer 200 and the first sensor device SED1 may be smaller than the minimum distance d2 between the buffer member 610 and the first sensor device SED1.

As described above, since the minimum distance d6 is smaller than the minimum distance d1 between the first adhesive member 710 and the first sensor device SED1, the minimum distance d2 between the buffer member 610 and the first sensor device SED1, and the minimum distance d3 between the second adhesive member 720 and the first sensor device SED1, the bonding of the display module 11 and the panel lower cover 600 may be facilitated.

In the embodiment of FIGS. 29 and 30, elements that have already been described above with reference to FIGS. 13 through 16 and 23 through 28 may be coupled between the panel lower cover 600 and the first sensor device SED1.

Figure 31:
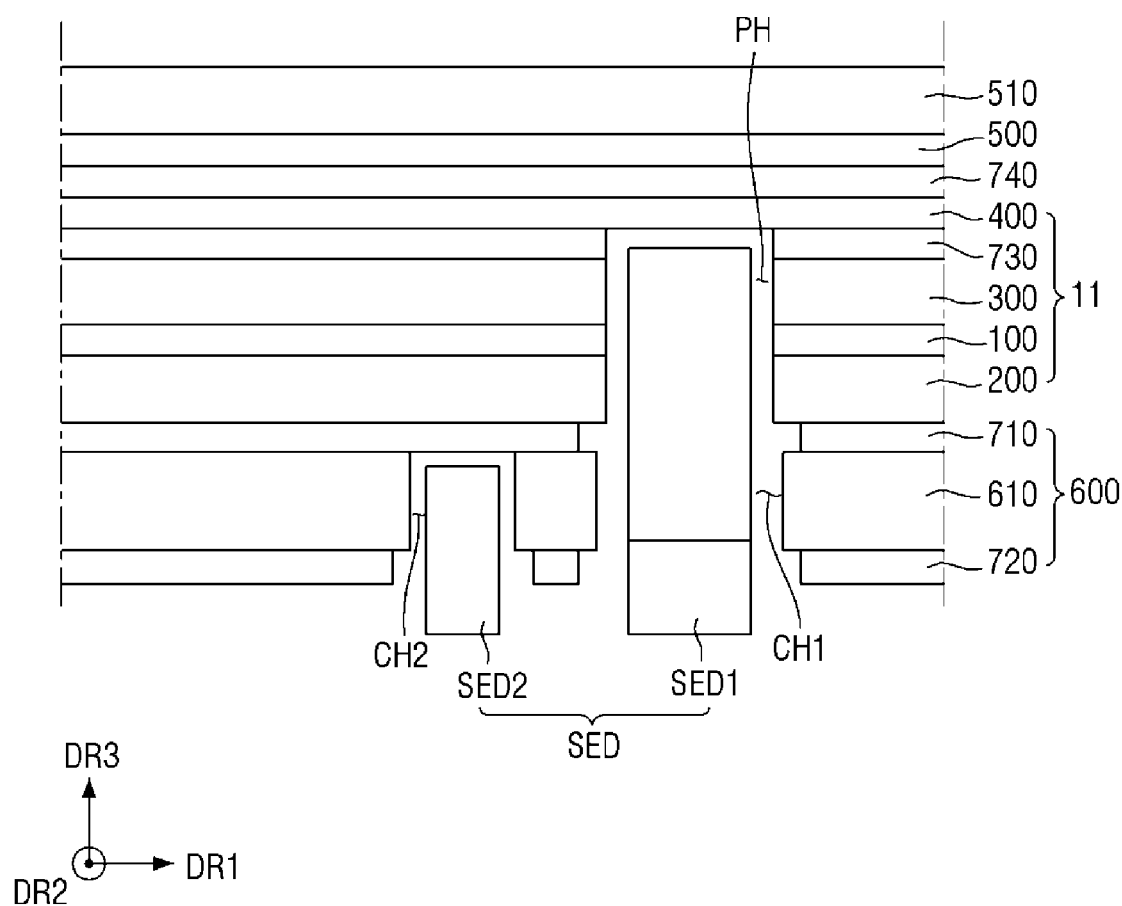
FIG. 31 is a cross-sectional view illustrating another embodiment of first and second cover holes of a display device according to the invention.

FIG. 31 is a cross-sectional view illustrating another embodiment of first and second cover holes of a display device according to the invention.

The embodiment of FIG. 31 differs from the embodiments of FIGS. 1 through 30 in that a second sensor device SED2 and a first adhesive member 710 overlap with each other in a second cover hole CH2.

Referring to FIG. 31, a first cover hole CH1, in which a first sensor device SED1 is disposed, and the second cover hole CH2, in which the second sensor device SED2 is disposed, are defined in a panel lower cover 600. The second cover hole CH2 may be spaced apart from the first cover hole CH1.

The second cover hole CH2 may be a hole that penetrates a buffer member 610 of the panel lower cover 600 and a second adhesive member 720. The second cover hole CH2 may not penetrate the first adhesive member 710 and may overlap with the first adhesive member 710.

The second sensor device SED2, which is disposed in the second cover hole CH2, may be a proximity sensor or an illumination sensor. Since the first adhesive member 710 is transparent, the first adhesive member 710 does not deteriorate the sensing characteristics of, for example, a proximity sensor or an illumination sensor. In contrast, the first sensor device SED1, which is disposed in the first cover hole CH1 and a panel hole PH, may be a camera sensor. Since a camera sensor needs as much light as possible, the first sensor device SED1 may penetrate not only the panel lower cover 600, but also a display module 11. Thus, the second sensor device SED2, which is disposed in the second cover hole CH2, and the first adhesive member 710 may overlap with each other.

Elements that have already been described above with reference to FIGS. 13 through 16 and 23 through 28 may be directly applicable to their respective counterparts between the second adhesive member 720/the buffer member 610 and the second sensor device SED2 in the second cover hole CH2.

Figure 32:
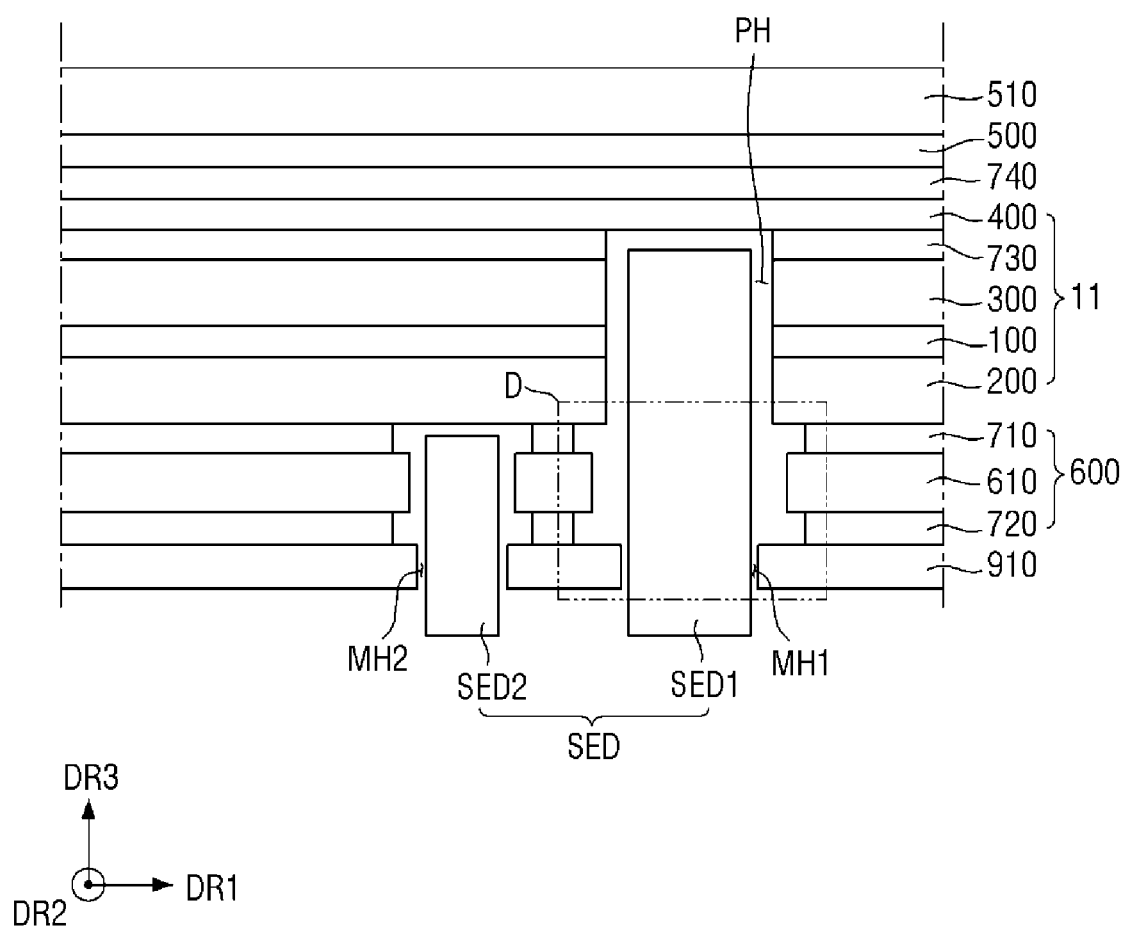
FIG. 32 is a cross-sectional view illustrating another embodiment of first and second cover holes of a display device according to the invention.
Figure 33:
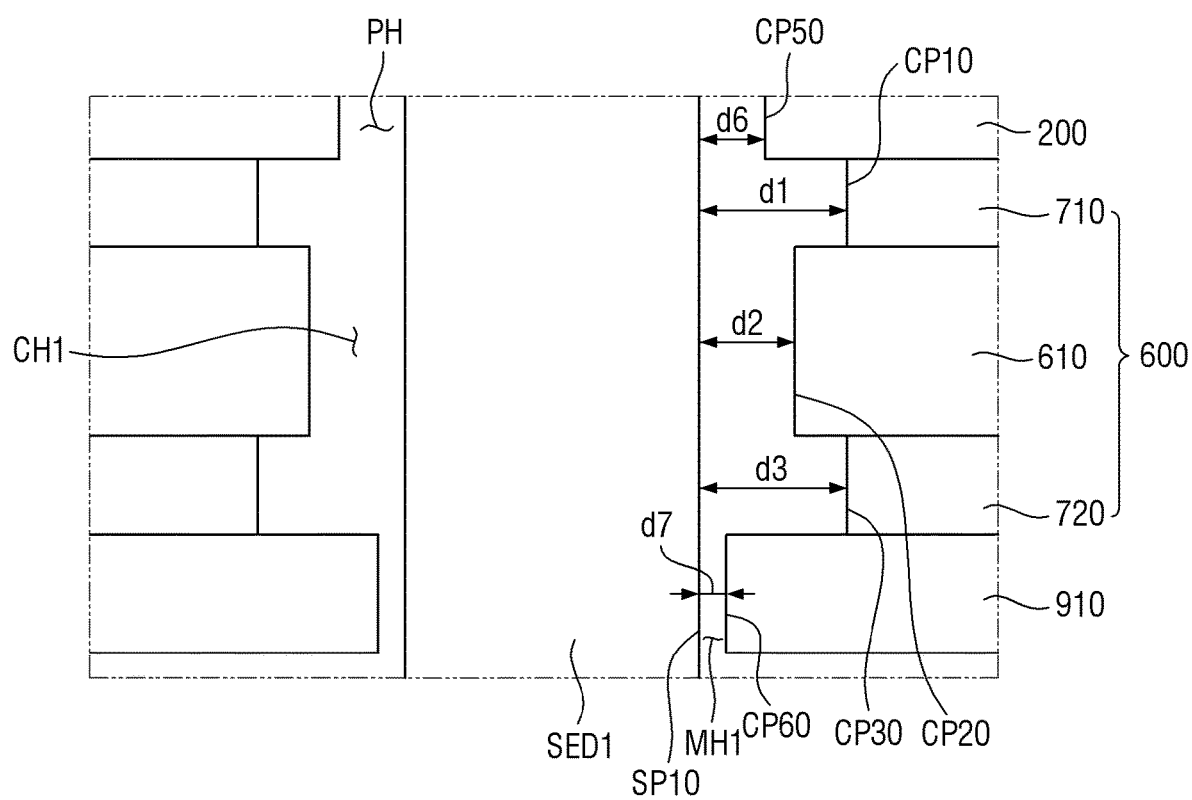
FIG. 33 is a cross-sectional view illustrating an area D of FIG. 32.

FIG. 32 is a cross-sectional view illustrating another embodiment of first and second cover holes of a display device according to the invention. FIG. 33 is a cross-sectional view illustrating an area D of FIG. 32.

The embodiment of FIGS. 32 and 33 differs from the embodiments of FIGS. 1 through 31 in that a metal plate 910 is further provided to be attached to the bottom of a panel lower cover 600.

Referring to FIGS. 32 and 33, the metal plate 910 may be attached to the bottom of the panel lower cover 600. The metal plate 910 may be attached to a surface of a second adhesive member 720 of the panel lower cover 600.

The metal plate 910 may be a heat dissipation member or a supporting member. A first plate hole MH1, in which a first sensor device SED1 is disposed, and a second plate hole MH2, in which a second sensor device SED2 is disposed, may be defined in the metal plate 910. The first plate hole MH1 may overlap with a panel hole PH and a first cover hole CH1. The second plate hole MH2 may overlap with a second cover hole CH2.

The first plate hole MH1 may have a smaller diameter than diameters of the panel hole PH and the first cover hole CH1. The second plate hole MH2 may have a smaller diameter than a diameter of the second cover hole CH2. The first plate hole MH1, the panel hole PH, and the first cover hole CH1 will hereinafter be described.

A minimum distance d6, in the panel hole PH, between a protective layer 200 and the first sensor device SED1 may be greater than a minimum distance d7, in the first plate hole MH1, between the metal plate 910 and the first sensor device SED1. Specifically, a minimum distance d6, in the panel hole PH between a cutting plane CP50 of the protective layer 200 and a sidewall SP10 of the first sensor device SED1 may be greater than a minimum distance d7 between a cutting plate CP60 of the metal plate 910 and the sidewall SP10 of the first sensor device SED1.

A minimum distance d1, in the first cover hole CH1, between a first adhesive member 710 and the first sensor device SED1 may be greater than the minimum distance d7, in the first plate hole MH1, between the metal plate 910 and the first sensor device SED1. Specifically, a minimum distance d1 between a cutting plane CP10 of the first adhesive member 710 and the sidewall SP10 of the first sensor device SED1 may be greater than a minimum distance d7 between the cutting plane CP60 of the metal plate 910 and the sidewall SP10 of the first sensor device SED1.

A minimum distance d2, in the first cover hole CH1, between the buffer member 610 and the first sensor device SED1 may be greater than the minimum distance d7, in the first plate hole MH1, between the metal plate 910 and the first sensor device SED1. Specifically, a minimum distance d2 between a cutting plane CP20 of the buffer member 610 and the sidewall SP10 of the first sensor device SED1 may be greater than a minimum distance d7 between the cutting plane CP60 of the metal plate 910 and the sidewall SP10 of the first sensor device SED1.

A minimum distance d3, in the first cover hole CH1, between the second adhesive member 720 and the first sensor device SED1 may be greater than the minimum distance d7, in the first plate hole MH1, between the metal plate 910 and the first sensor device SED1. Specifically, a minimum distance d3 between a cutting plane CP30 of the second adhesive member 720 and the sidewall SP10 of the first sensor device SED1 may be greater than the minimum distance d7 between the cutting plane CP60 of the metal plate 910 and the sidewall SP10 of the first sensor device SED1.

Since the diameter of the first plate hole MH1 of the metal plate 910 is smaller than the diameters of the first cover hole CH1 and the panel hole PH and the diameter of the second plate hole MH2 of the metal plate 910 is smaller than the diameter of the second cover hole CH2, the infiltration of foreign materials into the first cover hole CH1, the second cover hole CH2, and the panel hole PH may be prevented.

In concluding the detailed description, those skilled in the art will appreciate that many variations and modifications may be made to the preferred embodiments without substantially departing from the principles of the invention. Therefore, the disclosed preferred embodiments of the invention are used in a generic and descriptive sense only and not for purposes of limitation.

What is claimed is:

1. A foldable display device comprising:
   a display module in which a panel hole is defined;
   a sensor device disposed in the panel hole; and
   a panel lower cover which is disposed on a surface of the display module and in which a cover hole is defined such that the sensor device is disposed in the cover hole, the panel lower cover including:
      a buffer member;
      a first adhesive member, which attaches the buffer member to the surface of the display module; and
      a second adhesive member, which is adjacent to the first adhesive member with the buffer member interposed therebetween,
   wherein
   a minimum distance between the first adhesive member and the sensor device is greater than a minimum distance between the buffer member and the sensor device.

2. The foldable display device of claim 1, wherein a minimum distance between the second adhesive member and the sensor device in the cover hole is greater than the minimum distance between the buffer member and the sensor device.

3. The foldable display device of claim 2, wherein the minimum distance between the first adhesive member and the sensor device is smaller than or equal to the minimum distance between the second adhesive member and the sensor device.

4. The foldable display device of claim 3, wherein a distance between the buffer member and the sensor device in the cover hole increases as a distance to the display module is smaller.

5. The foldable display device of claim 4, wherein a distance between the first adhesive member and the sensor device in the cover hole increases as the distance to the display module is smaller.

6. The foldable display device of claim 5, wherein a cutting plane of the first adhesive member and a cutting plane of the buffer member are in contact with, and are aligned with, each other in the cover hole.

7. The foldable display device of claim 3, wherein a distance between the buffer member and the sensor device in the cover hole decreases as a distance to the display module is smaller.

8. The foldable display device of claim 7, wherein a cutting plane of the second adhesive member and a cutting plane of the buffer member are in contact with, and are aligned with, each other in the cover hole.

9. The foldable display device of claim 1, wherein a minimum diameter of the cover hole is greater than a maximum diameter of the panel hole.

10. The foldable display device of claim 1, wherein the display module includes a display panel, which includes pixels which display an image, and a protective layer, which is disposed on a surface of the display panel.

11. The foldable display device of claim 10, wherein
    the protective layer is in contact with the first adhesive member, and
    a minimum distance between the protective layer and the sensor device is smaller than the minimum distance between the first adhesive member and the sensor device.

12. The foldable display device of claim 1, further comprising:
    a metal plate attached to a surface of the panel lower cover via the second adhesive member,
    wherein a plate hole, which overlaps with the cover hole, is defined in the metal plate.

13. The foldable display device of claim 12, wherein
    the sensor device is disposed in the plate hole, and
    a minimum distance between the metal plate and the sensor device is smaller than one of the minimum distance between the first adhesive member and the sensor device, a minimum distance between the second adhesive member and the sensor device, and the minimum distance between the buffer member and the sensor device.

14. A foldable display device comprising:
a display module in which a panel hole is defined;
a first sensor device disposed in the panel hole;
a second sensor device; and
a panel lower cover which is disposed on a surface of the display module and in which a first cover hole and a second cover hole are defined such that the first sensor device is disposed in the first cover hole, and the second sensor device is disposed in the second cover hole, the panel lower cover including:
a buffer member; and
a first adhesive member which attaches the buffer member to the surface of the display module,
wherein, in the first cover hole, a minimum distance between the first adhesive member and the first sensor device is greater than a minimum distance between the buffer member and the first sensor device, and
in the second cover hole, the first adhesive member overlaps with the second cover hole.

15. The foldable display device of claim 14, wherein the panel lower cover further includes a second adhesive member, which is adjacent to the first adhesive member with the buffer member interposed therebetween.

16. The foldable display device of claim 15, wherein the second cover hole penetrates the second adhesive member and the buffer member.

17. The foldable display device of claim 15, wherein a minimum distance between the second adhesive member and the first sensor device is greater than the minimum distance between the buffer member and the first sensor device.

18. The foldable display device of claim 15, wherein a minimum distance between the second adhesive member and the second sensor device is greater than a minimum distance between the buffer member and the second sensor device.

19. The foldable display device of claim 14, wherein the second sensor device is spaced apart from the first adhesive member in a thickness direction of the panel lower cover.

* * * * *